US012609476B2

(12) United States Patent
Peng et al.

(10) Patent No.: US 12,609,476 B2
(45) Date of Patent: Apr. 21, 2026

(54) SOCKET PROTECTION DOOR STRUCTURE AND SOCKET

(71) Applicant: Ningbo Goneo Electric Appliance Co., Ltd., Ningbo (CN)

(72) Inventors: Meinan Peng, Ningbo (CN); Xianjie Tang, Ningbo (CN); Qiurong Wu, Ningbo (CN); Guanghui Gong, Ningbo (CN)

(73) Assignee: Ningbo Goneo Electric Appliance Co., Ltd., Cixi Ningbo (CN)

( * ) Notice: Subject to any disclaimer, the term of this patent is extended or adjusted under 35 U.S.C. 154(b) by 336 days.

(21) Appl. No.: 18/561,281

(22) PCT Filed: Aug. 11, 2021

(86) PCT No.: PCT/CN2021/112106

§ 371 (c)(1),
(2) Date: Nov. 15, 2023

(87) PCT Pub. No.: WO2022/241957

PCT Pub. Date: Nov. 24, 2022

(65) Prior Publication Data

US 2024/0250466 A1 Jul. 25, 2024

(30) Foreign Application Priority Data

May 18, 2021 (CN) ......................... 202110542305.5
May 18, 2021 (CN) ......................... 202121067536.7
May 18, 2021 (CN) ......................... 202121068454.4

(51) Int. Cl.
*H01R 13/447* (2006.01)
*H01R 13/426* (2006.01)
(Continued)

(52) U.S. Cl.
CPC ......... *H01R 13/447* (2013.01); *H01R 13/426* (2013.01); *H01R 13/514* (2013.01); *H01R 13/631* (2013.01)

(58) Field of Classification Search
CPC .. H01R 13/447; H01R 13/426; H01R 13/514; H01R 13/631; H01R 13/4534; H01R 24/78; H01R 13/4538
See application file for complete search history.

(56) References Cited

U.S. PATENT DOCUMENTS 6,951,469 B1 * 10/2005 Lin .................... H01R 13/4534 439/519
7,452,221 B1 * 11/2008 Oddsen .............. H01R 13/4534 439/140
(Continued)

FOREIGN PATENT DOCUMENTS

CN 204966787 U 1/2016
CN 207426248 U 5/2018
(Continued)

OTHER PUBLICATIONS

International search report of PCT application No. PCT/CN2021/112106 issued on Jan. 26, 2022.
(Continued)

*Primary Examiner* — Abdullah A Riyami
*Assistant Examiner* — Nader J Alhawamdeh
(74) *Attorney, Agent, or Firm* — Knobbe, Martens, Olson & Bear, LLP

(57) ABSTRACT

Disclosed in the present disclosure are a socket protection door structure, including a support seat, a protection door and an elastic reset member, wherein the support seat is provided with two sets of first via holes which correspond to an N-pole plug bush and an L-pole plug bush of the socket, respectively; the protection door is movably connected to the support seat, and the protection door is provided with a
(Continued)

second via hole and is configured to be capable of moving sequentially in a first direction and a second direction, such that one set of the first via holes is exposed and another set of first via holes is correspondingly communicated with the second via hole; and the elastic reset member is disposed between the support seat and the protection door, and is configured to reset the protection door.

20 Claims, 13 Drawing Sheets

(51) Int. Cl.
*H01R 13/514* (2006.01)
*H01R 13/631* (2006.01)

(56) References Cited

U.S. PATENT DOCUMENTS

| | | | | |
|---|---|---|---|---|
| 9,059,530 | B2 * | 6/2015 | Byrne | H01R 13/4534 |
| 9,543,715 | B2 * | 1/2017 | Savicki, Jr. | H01R 13/4532 |
| 9,761,985 | B1 * | 9/2017 | Peng | H01R 13/4534 |
| 9,887,483 | B2 | 2/2018 | Zhang et al. | |
| 2016/0013577 | A1 * | 1/2016 | Diakomis | H01R 13/4536 439/138 |
| 2021/0328378 | A1 | 10/2021 | Yu et al. | |
| 2023/0178924 | A1 * | 6/2023 | Ma | H01R 13/447 439/271 |
| 2024/0250466 | A1 * | 7/2024 | Peng | H01R 13/514 |

FOREIGN PATENT DOCUMENTS

| | | |
|---|---|---|
| CN | 209497038 U | 10/2019 |
| CN | 209692024 U | 11/2019 |
| CN | 212182622 U | 12/2020 |
| CN | 212209830 U | 12/2020 |

OTHER PUBLICATIONS

China National Intellectual Property Administration, First office action of Chinese application No. 202110542305.5 issued on Mar. 17, 2022.

Extended European search report of counterpart European application No. 21940406.8 issued on Sep. 19, 2024.

Notice of Reasons for Refusal of Japanese application No. 2023-571822 issued on Nov. 25, 2024.

* cited by examiner

SOCKET PROTECTION DOOR STRUCTURE AND SOCKET

CROSS-REFERENCE TO RELATED APPLICATIONS

This application is a U.S. national stage of international application No. PCT/CN2021/112106, filed on Aug. 11, 2021, and claims priority to Chinese Patent Application No. 202110542305.5, filed on May 18, 2021, and entitled "SOCKET PROTECTION DOOR STRUCTURE AND SOCKET", Chinese Patent Application No. 202121068454.4, entitled "SOCKET PROTECTION DOOR STRUCTURE AND SOCKET", and Chinese Patent Application No. 202121067536.7, entitled "SOCKET PROTECTION DOOR STRUCTURE AND SOCKET", the disclosures of which are herein incorporated by reference in their entireties.

TECHNICAL FIELD

The present disclosure relates to the field of socket technologies and particularly relates to a socket protection door structure and a socket.

BACKGROUND

A socket is typically provided with a socket protection door structure. The socket protection door structure is disposed between a jack and a plug bush of the socket and is configured to prevent objects from accidentally entering into the plug bush from the jack, thereby playing a function of electric leakage prevention.

SUMMARY

In some embodiments of the present disclosure, a socket protection door structure is provided. The socket protection door structure includes a support seat, a protection door, and an elastic reset member;

the support seat is provided with two sets of first via holes which correspond to an N-pole plug bush and an L-pole plug bush of a socket, respectively;

the protection door is movably connected to the support seat, and the protection door is provided with a second via hole and is configured to be capable of moving sequentially in a first direction and a second direction, such that one set of the first via holes is exposed and another set of first via holes is correspondingly communicated with the second via hole, wherein the first direction is in a direction perpendicular to a top surface, facing jacks of the socket, of the protection door, and the second direction is in a distribution direction of the two sets of first via holes; and the elastic reset member is disposed between the support seat and the protection door and is configured to reset the protection door, and the support seat includes a bottom support portion and a side circumference portion, the socket protection door structure further comprises a stopper, wherein the stopper is disposed on the bottom support portion of the support seat, and a top end of the stopper is disposed in the second via hole of the protection door; and the stopper is capable of abutting against a wall of the second via hole when the protection door is tilted to one side under single-pin insertion.

In some implementations, the socket protection door structure further includes: two sets of outer guide shafts disposed on outer sides of two sets of side walls of the protection door and extending in the second direction, respectively;

the two sets of first via holes are disposed on the bottom support portion, and a bottom end of the side circumference portion is connected to the bottom support portion; and guide slots are respectively provided on two sets of side walls, extending in the second direction, of the side circumference portion, and are configured to accommodate the outer guide shafts and guide movement of the outer guide shafts in the first direction and the second direction.

In some implementations, the guide slot includes a guide section, a limit section, a first direction section and a second direction section which are sequentially in communication with one another, all of the guide section, the limit section and the first direction section extend in the first direction, and the second direction section extends in the second direction;

the guide section is configured to guide the outer guide shaft into the limit section;

the limit section is configured to limit the outer guide shaft within the first direction section;

the first direction section is configured to guide the movement of the outer guide shaft in the first direction; and the second direction section is configured to guide the movement of the outer guide shaft in the second direction.

In some implementations, the guide slot and the bottom support portion are arranged in a staggered fashion in a third direction, wherein the third direction is a direction perpendicular to the second direction.

In some implementations, the limit section includes a third side wall and a fourth side wall which are symmetrically arranged; and the distance between the third side wall and the fourth side wall gradually increases in a direction proximal to the first direction section, and the minimum distance between the third side wall and the fourth side wall is smaller than an outer diameter of the outer guide shaft.

In some implementations, the socket protection door structure further includes two sets of symmetrically-arranged guide blocks which are disposed on the top surface of the bottom support portion, the guide block is provided with a guiding surface, and the guide surface is obliquely arranged, and extends in the second direction;

the guide surface is configured to be in contact with the protection door to guide movement of the protection door; and the movement of the protection door includes movement of the protection door in the second direction driven by two-pin, and tilting movement of the protection door driven by single-pin.

In some implementations, the socket protection door structure further includes two sets of inner guide shafts;

the two sets of inner guide shafts are symmetrically disposed on the protection door, and correspond to the two sets of guide blocks one by one; and the inner guide shaft is configured to be in contact with the corresponding guide surface to guide the movement of the protection door.

In some implementations, the protection door includes: a protection door panel and a frame body, the protection door panel is provided with a top surface, and is connected to the top end of the frame body, and the frame body is movably connected to the support seat; and the inner guide shafts are disposed on inner sides of two side walls of the frame body which extend in the second direction.

In some implementations, the frame body includes: a side frame and a panel rack, the panel rack is disposed inside the side frame, and the side frame is movably connected to the support seat;

two sets of escape slots are arranged on the bottom surface of the panel rack, and correspond to the two sets of guide blocks one by one; and the escape slot at least receives the top of the corresponding guide block when the protection door moves in the second direction.

In some implementations, the guide block is in contact with the panel bottom or the side wall bottom of the protection door.

In some implementations, the socket protection door structure further includes two sets of first stop blocks and two sets of second stop blocks;

the two sets of first stop blocks correspond to the two sets of second stop blocks one by one, and are disposed on two sides of the protection door and extend in a third direction, respectively, and the two sets of second stop blocks are disposed on side walls of the two sets of first via holes, respectively, wherein the third direction is a direction perpendicular to the second direction; and when the protection door is tilted under single-pin insertion, the first stop block tilted in a direction proximal to the first via hole cooperates with the corresponding second stop block to achieve a stop.

In some implementations, the protection door includes a protection door panel and a frame body;

the protection door panel is provided with the top surface and the second via hole and is connected to the top end of the frame body, and the frame body is movably connected to the support seat; and the two sets of first stop blocks are disposed at bottom ends of two sets of side walls of the frame body which extend in the third direction, respectively.

In some implementations, the frame body includes two sets of first side plates arranged oppositely and two sets of second side plates arranged oppositely;

two ends of the first side plate are vertically connected to two ends of the second side plate, respectively, and the second side plate extends in the third direction; and the first stop block is disposed at the bottom end of the second side plate, and a stop slot is provided between the first stop block and the first side plate and is configured to accommodate the second stop block.

In some implementations, a bottom wall of the first side plate includes: a main body section, and two sets of tilt sections disposed on two sides of the main body section; and a first end of the tilt section is connected to the main body section, and a second end of the tilt section is connected to the first stop block and is more proximal to the protection door panel relative to the first end.

In some implementations, the socket protection door structure further includes a fixing block, wherein the fixing block is disposed on the bottom surface of the protection door, and is connected to the elastic reset member.

In some implementations, the elastic reset member is a compression spring, and the top end of the elastic reset member sleeves the fixing block.

In some implementations, the support seat is provided with a limit groove, and the limit groove is configured to accommodate the bottom of the elastic reset member and allow the elastic reset member to correspondingly move along with the moving protection door.

In some implementations, the limit groove includes a first groove wall and a second groove wall which are symmetrically arranged and distributed in the second direction; and at least one of the first groove wall and the second groove wall is obliquely arranged and extends in the second direction to receive the elastic reset member moving with the protection door.

In some implementations, the socket protection door structure further includes a face cover provided with jacks corresponding to jacks of the socket; and the face cove is mounted on the support seat in a covering fashion, and the bottom surface of the face cover is closely attached to the top surface of the protection door.

In some implementations, the socket protection door structure further includes a support block disposed on the bottom surface of the face cover;

a stopper is arranged on the bottom support portion, and is provided with a first face wall configured to abut against the wall of the second via hole in the protection door; and the support block is configured to abut against a second face wall of the stopper, and the second face wall is opposite to the first face wall.

In some implementations, the socket protection door structure further includes a positioning block disposed on the bottom surface of the face cover; and the support seat includes a side circumference portion, and the positioning block abuts against an outer wall of the side circumference portion to position the face cover on the support seat.

In some embodiments of the present disclosure, a socket is further provided, and includes the socket protection door structure according to any one of the above embodiments.

BRIEF DESCRIPTION OF DRAWINGS

In order to describe the technical solutions in the embodiments of the present application more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 19 is a schematic assembled diagram of a socket according to some embodiments of the present disclosure.

DETAILED DESCRIPTION

To make the technical solutions and advantages of the present disclosure clearer, the embodiments of the present disclosure will be further described in detail below with reference to the accompanying drawings.

In order to facilitate understanding of a positional arrangement relationship of various components in a socket protection door structure according to the embodiments of the present disclosure, taking a state in which the socket protection door structure according to the embodiments of the present disclosure is applied to a socket as a reference, a direction proximal to a jack on a socket panel is defined as a top direction or an upper direction, and conversely, the direction distal to the jack on the socket panel is defined as a bottom direction or a lower direction. In the embodiments of the present disclosure, as shown in FIG. 1, the first direction D1 is perpendicular to a top surface of a protection door, and it can be considered that the first direction D1 is the vertical direction.

It should be noted that the term "two sets" used in the embodiments of the present disclosure refers to two sets of components arranged at intervals, and the number of components included in each set of components may be one, two or more.

Figure 1:
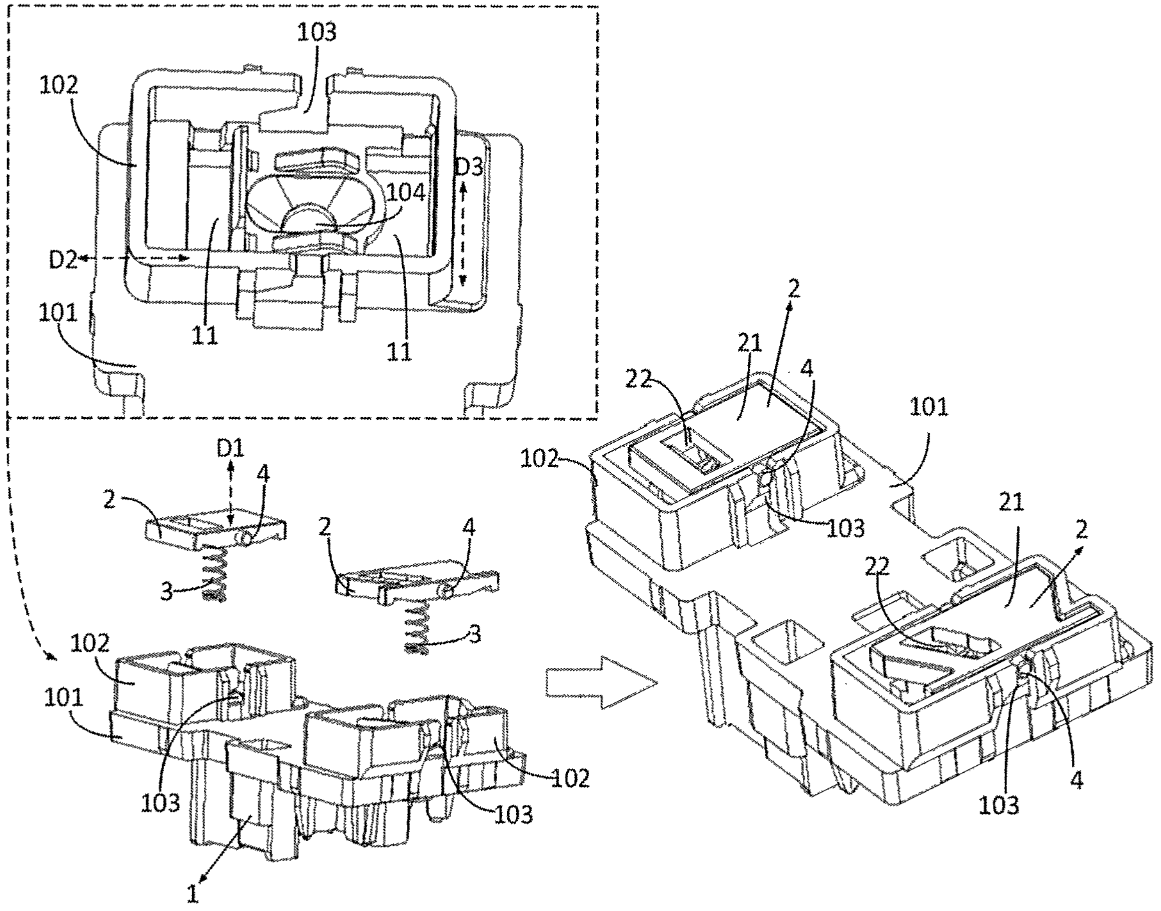
FIG. 1 is a schematic structural diagram of a socket protection door structure according to some embodiments of the present disclosure, in which a schematic state of the socket protection door structure from an exploded state to an assembled state and a partial structure of a support seat are shown, respectively.
Figure 2:
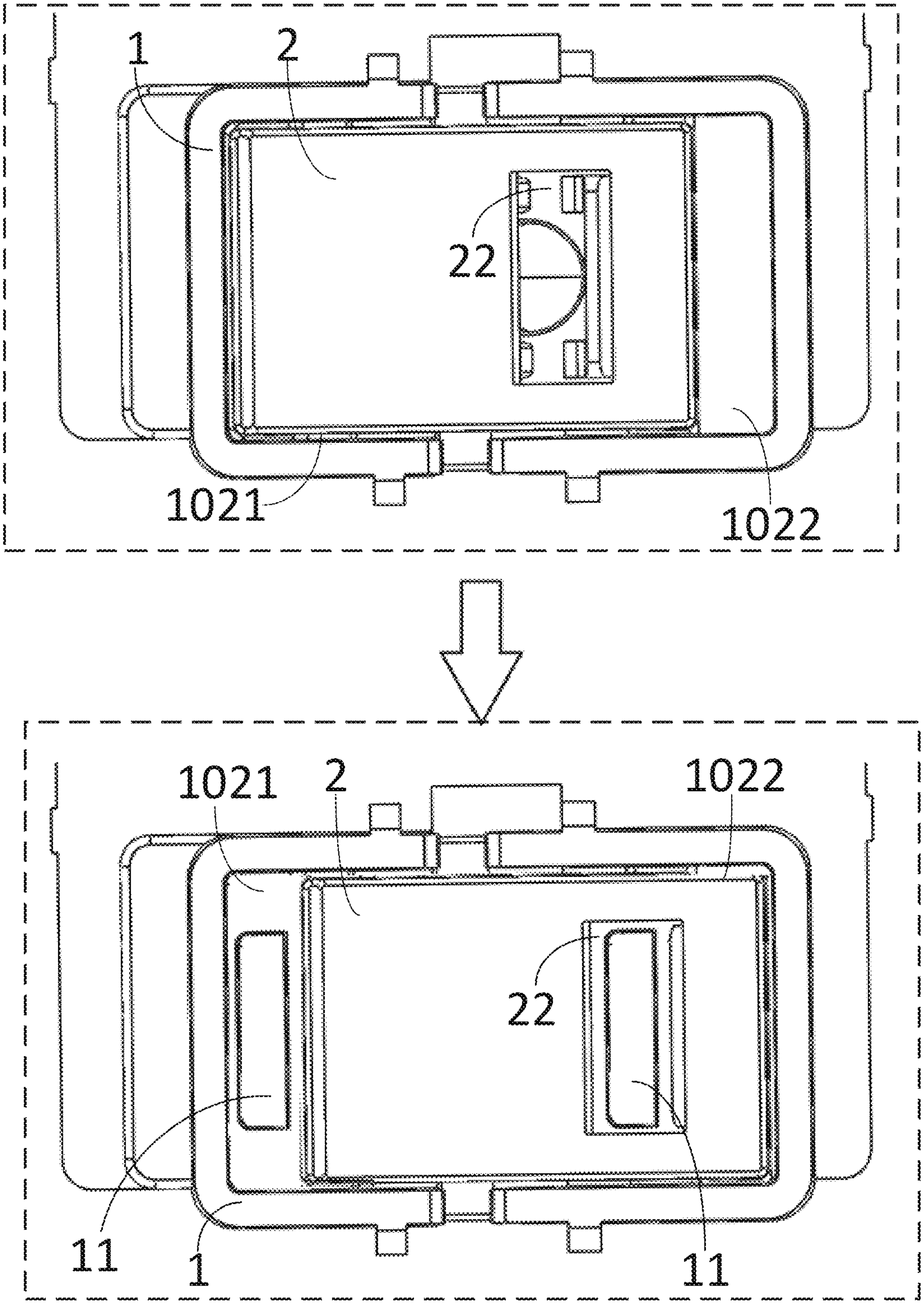
FIG. 2 is a schematic diagram of states of a socket protection door structure according to some embodiments of the present disclosure, in which the upper part shows that a protection door is in an initial state and the lower part shows that the protection door is in an escaped state.

For example, the first via holes 11 are arranged in two sets distributed at intervals, the number of the first via holes 11 in each set may be one or multiple, and FIG. 1 and FIG. 2 in the embodiments of the present disclosure only illustrate a case where each set of the first via holes 11 includes one first via holes 11.

A distribution direction D2 of two sets of first via holes is consistent with a distribution direction from an N-pole plug bush to an L-pole plug bush in the socket. The distribution direction from the N-pole plug bush to the L-pole plug bush refers to an extension direction from the N-pole plug bush to the L-pole plug bush, or an extension direction from the L-pole plug bush to the N-pole plug bush. In the embodiments of the present disclosure, the distribution direction D2 of the two sets of first via holes may be defined as a horizontal direction, that is, the distribution direction from the N-pole plug bush to the L-pole plug bush is the horizontal direction. For example, the N-pole plug bush is disposed on the left side, the L-pole plug bush is disposed on the right side, and the N-pole plug bush and the L-pole plug bush refer to the two-pole plug bushes. Of course, the N-pole plug bush and the L-pole plug bush may also belong to three-pole plug bushes. Although the N-pole plug bush and the L-pole plug bush are tilted in the three-pole plug bush, it is still considered that one of them is disposed on the left side and the other is disposed on the right side.

The orientation terms used in the embodiments of the present disclosure are only intended to describe structures and relationships between structures more clearly, and are not intended to describe absolute orientations. The orientation may change when a product is placed in different postures, for example, "upper" and "lower" may be interchanged.

In some practices, the socket protection door structure includes a housing, a protection door disposed in the housing, and a torsion spring for resetting the protection door. However, the current protection door structure has some defects, for example, the torsion spring is easy to deviate and lose efficacy along with the frequent movement of the protection door, the protection door is difficult to reset after the frequent movement, and the protective door is easy to be inserted by a single pin.

FIG. 1 is a schematic structural diagram of a socket protection door structure according to some embodiments of the present disclosure, in which a schematic state of the socket protection door structure from an exploded state to an assembled state and a partial structure of a support seat are shown, respectively. According to an aspect of the embodiments of the present disclosure, a socket protection door structure is provided. As shown in FIG. 1, the socket protection door structure includes a support seat 1, a protection door 2, and an elastic reset member 3. The support seat 1 is provided with two sets of first via holes 11 which correspond to an N-pole plug bush and an L-pole plug bush of the socket, respectively. In other words, the two sets of first via holes 11 correspond to an N-pole jack and an L-pole jack of the socket one by one. In the case that the socket protection door structure is applied to the socket, an N-pole plug and an L-pole plug can be inserted into the N-pole plug bush and the L-pole plug bush through the two sets of first via holes 11, respectively. For example, each set of first via holes 11 includes one or more first via holes 11.

In the embodiment of the present disclosure, the support seat 1 is provided with one or more protection door assembling regions, and the protection door assembling regions correspond to the protection doors one by one in the number. That is, one protection door 2 is mounted in each protection door assembling region, and each protection door 2 corresponds to one elastic reset member 3. FIG. 1 illustrates, as an example, a case in which the support seat 1 is provided with two sets of protection doors 2, one of which protects a two-pole plug bush and the other protects a three-pole plug bush. The socket protection door structure involved in the embodiment of the present disclosure is described with respect to the arrangement and operation of one set of the protection doors 2.

In the embodiments of the present disclosure, the protection door 2 is movably connected to the support seat 1. As shown in FIG. 1, the protection door 2 is provided with a second via hole 22, and is configured to be capable of sequentially moving in a first direction D1 and a second direction D2, such that one set of the first via holes 11 is exposed and another set of first via holes 11 is correspondingly communicated with the second via hole 22 in the protection door 2. As shown in FIG. 1, the first direction D1 is in a direction perpendicular to the top surface, facing jacks of the socket, of the protection door 2, and the second direction D2 is in a distribution direction of the two sets of first via holes 11. The elastic reset member 3 is disposed between the support seat 1 and the protection door 2 and is configured to reset the protection door 2.

The protection door 2 is movably connected to the support seat 1, such that the protection door 2 can move along the support seat 1 and the moving protection door 2 can be interchanged between an initial state and an escaped state. When the protection door 2 is in the initial state, the protection door 2 blocks the two sets of first via holes 11 to provide protection for the N-pole plug bush and the L-pole plug bush in the socket. When pins drive the protection door 2 to move to enable the protection door 2 to change from the initial state to the escaped state, the position of the protection door 2 on the support seat 1 is changed accordingly due to the movement of the protection door 2 on the support seat 1, such that one set of the first via holes 11 in the support seat 1 is exposed and another set of first via holes 11 is correspondingly communicated with the second via hole 22 in the protection door 2. In this way, both two sets of the first via holes 11 are actually exposed when the protection door 2 is in the escaped state, that is, the pins are allowed to be inserted into the corresponding plug bushes through the two sets of first via holes 11, respectively.

FIG. 2 is a schematic diagram of states of a socket protection door structure according to some embodiments of the present disclosure, in which the upper part shows that a protection door is in an initial state and the lower part shows that the protection door is in an escaped state. As shown in FIG. 2, when the protection door 2 is in the initial state, the second via hole 22 in the protection door panel 201 is staggered with the two sets of first via holes 11 in the support seat 1, such that other parts of the protection door panel 201 can block the two sets of first via holes 11. When the protection door 2 moves from the initial state to the escaped state, the second via hole 22 in the protection door 2 can be correspondingly communicated with one of the two sets of first via holes 11 (this first via hole 11 is referred to as the first set of first via holes 11 herein). When the protection door 2 moves from the initial state to the escaped state, the protection door 2 moves from a first position to a second position on the support seat 1 accordingly. Thus, by enabling another set of first via holes 11 to be at the first position on the support seat 1 (another set of first via hole 11 is referred to as the second set of first via holes 11 herein), the protection door 2 can block the second set of first via holes 11 at the first position. When the protection door 2 moves to the second position, the second set of first via holes 11 at the first position is exposed due to the withdrawal of the protection door 2. Therefore, when the protection door 2 is in the escaped state, the first set of first via holes 11 is correspondingly communicated with the second via hole 22 in the protection door 2 so as to be exposed, and the second set of first via holes 11 is exposed due to the withdrawal of the protection door 2, such that both two sets of first via holes 11 are exposed for insertion of the pins.

When the pins abut against the top surface 21 of the protection door 2, the protection door 2 can be driven to move, first, in a first direction D1 perpendicular to the top surface 21 of the protection door 2, namely, from top to bottom, such that the protection door 2 moves more smoothly in the first direction D1 without jamming. Then, the direction of the movement is changed, and the protection door 2 moves in a second direction D2 in which the N-pole plug bush and the L-pole plug bush of the socket are distributed until the two sets of first via holes 11 in the support seat 1 are exposed. When the protection door 2 moves from the initial state to the escaped state, the elastic reset member 3 is compressed by the protection door 2, and thus has an elastic force. After the pins are pulled out from the plug bushes, the elastic reset member 3 is reset under the action of the elastic force to drive the protection door 2 to also reset to the initial state.

Figure 9:
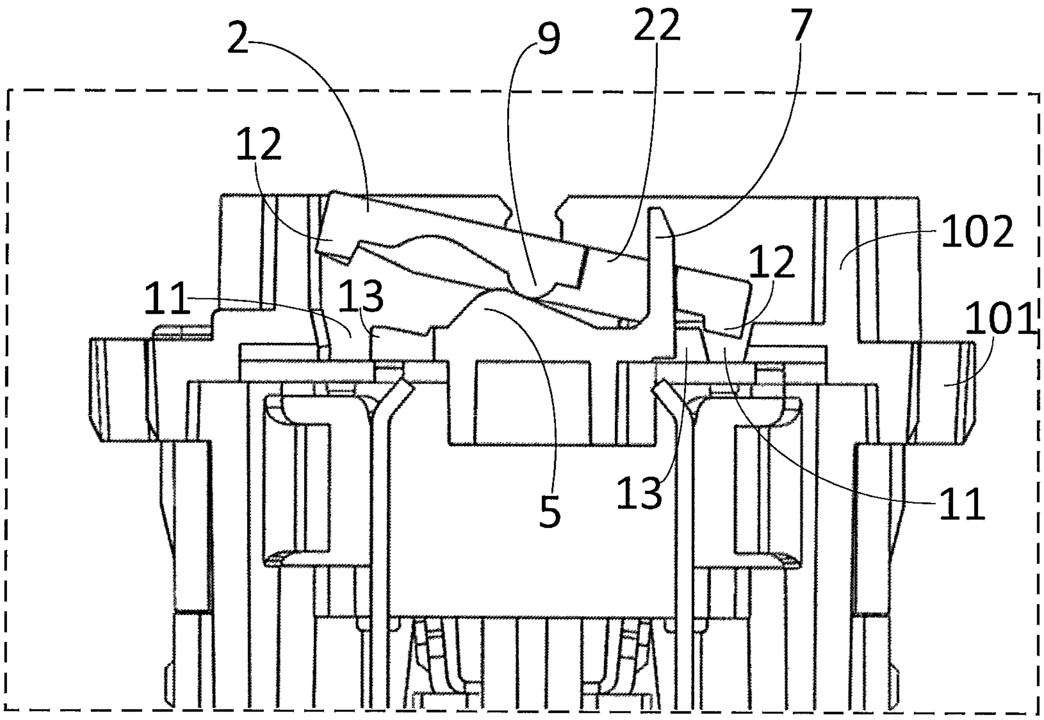
FIG. 9 is a schematic partial structure diagram of a socket protection door structure in a state of tilting to one side according to some embodiments of the present disclosure.
Figure 10:
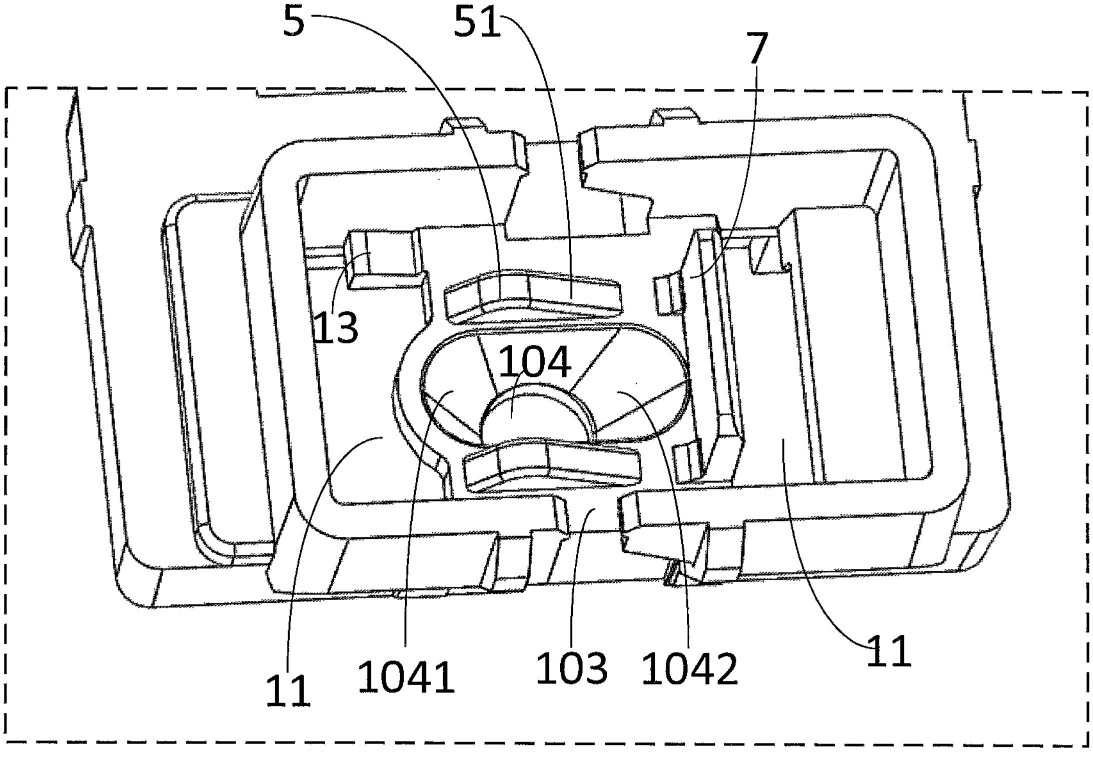
FIG. 10 is a schematic partial structure diagram of another support seat according to some embodiments of the present disclosure.

The support seat 1 includes a bottom support portion 101 and a side circumference portion 102. As shown in FIGS. 9 and 10, the socket protection door structure according to the embodiments of the present disclosure further includes a stopper 7 disposed on the bottom support portion 101 of the support seat 1. The top end of the stopper 7 is disposed in the second via hole 22 in the protection door panel 201 of the protection door 2. When the protection door 2 is tilted to one side under single-pin insertion, the stopper 7 can abut against the wall of the second via hole 22.

In some embodiments, the stopper 7 is in the shape of a flat plate. When the protection door 2 is tilted towards the insertion side under single-pin insertion, the stopper 7 can abut against the wall of the second via hole 22 in the protection door 2 to stop the rotating protection door 2, such that the protection door 2 cannot move in the second direction D2, but still plays a role in protecting the plug bush, thereby achieving the function of preventing the insertion of the single pin. In addition, the stopper 7 is provided to facilitate the smooth reset of the tilted protection door 2, and the aesthetics is improved by using the stopper to block the elastic reset member 3 in sight.

Figure 3:
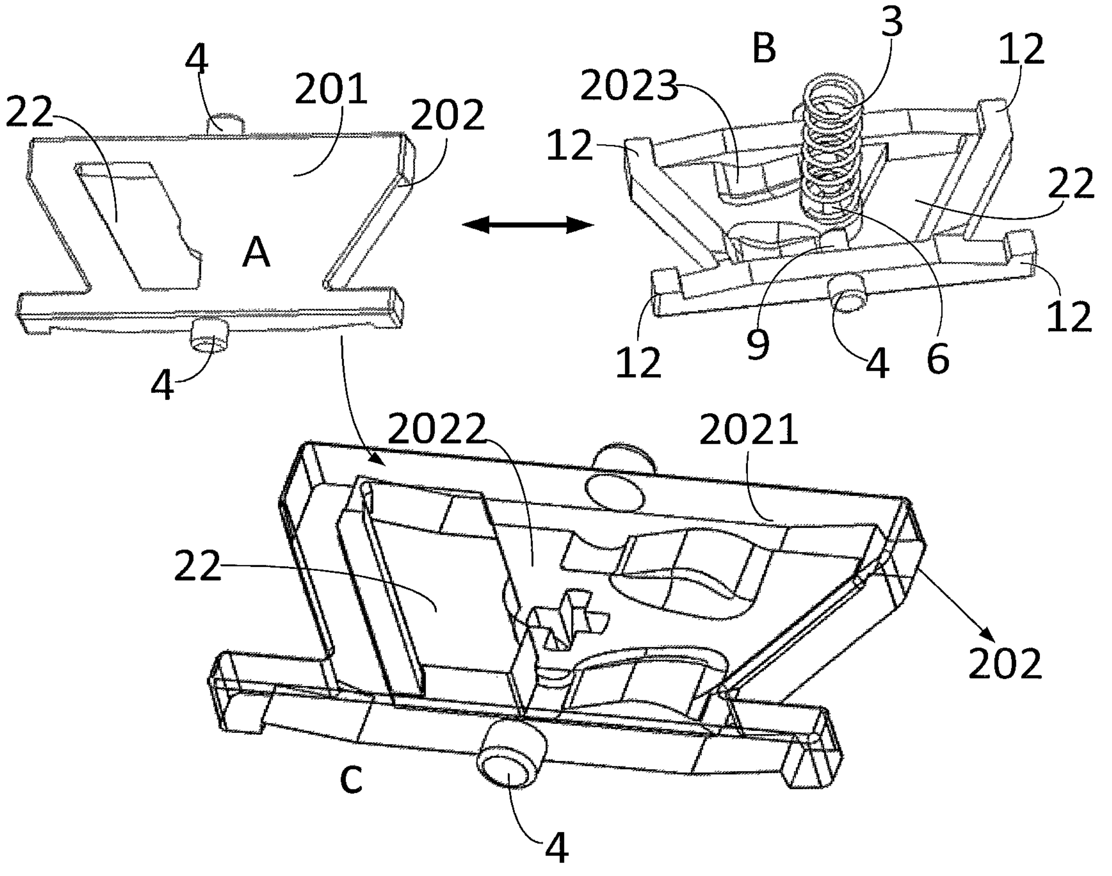
FIG. 3 is a schematic structural diagram of a three-pole protection door according to some embodiments of the present disclosure, in which A shows the front structure of the protection door, B shows the back structure of the protection door, and C shows the frame body structure in the protection door except a panel.
Figure 4:
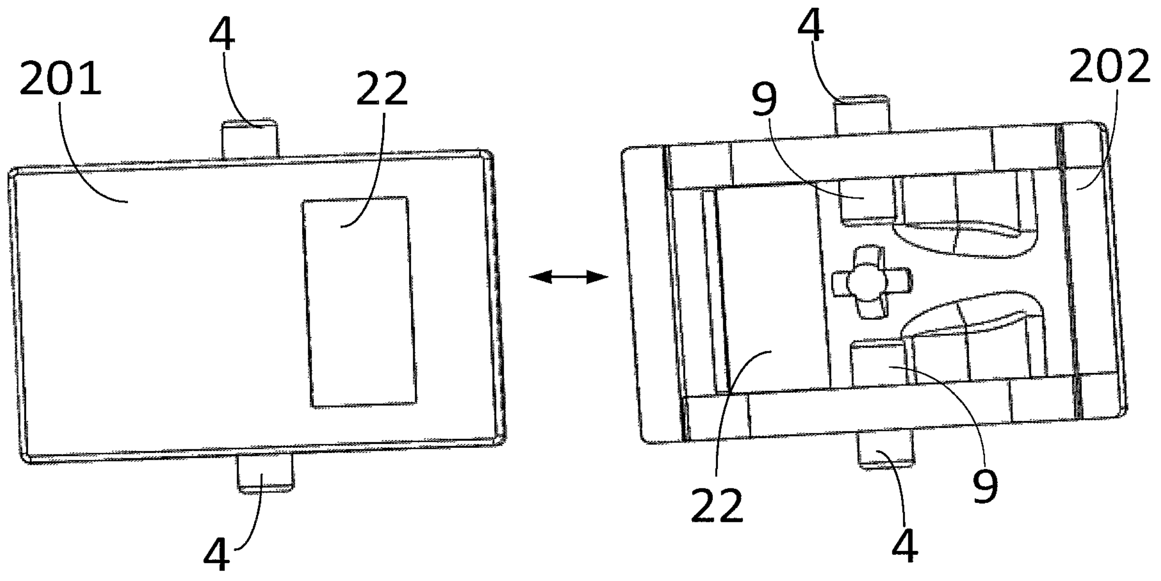
FIG. 4 is a schematic structural diagram of a two-pole protection door according to some embodiments of the present disclosure, in which a front structure and a back structure of the protection door are shown, respectively.

FIG. 3 is a schematic structural diagram of a three-pole protection door according to some embodiments of the present disclosure, in which A shows the front structure of the protection door, B shows the back structure of the protection door, and C shows the frame body structure in the protection door 2 except a protection door panel 201. FIG. 4 is a schematic structural diagram of a two-pole protection door according to some embodiments of the present disclosure, in which a front structure and a back structure of the protection door 2 are shown, respectively.

In some implementations, as shown in FIG. 3 or 4, the protection door 2 includes a protection door panel 201 and a frame body 202. The frame body 202 is movably connected to the support seat 1, the protection door panel 201 is connected to the top end of the frame body 202, and the top surface of the protection door panel 201 is the top surface 21 of the protection door 2 described above. The protection door panel 201 is provided with a second via hole 22.

The protection door panel 201 of the protection door 2 is more proximal to the jacks of the socket relative to the frame body 202 when the protection door panel 201 is applied to the socket. In some embodiments, the top surface of the protection door panel 201 is designed to be partially planar and partially beveled. For example. the top surface of the protection door panel 201 adjacent to the second via hole 22 is provided as an inclined surface, with the rest being provided as a plane. As shown in FIG. 3 or 4, the protection door panel 201 is provided with the second via hole 22. When the protection door 2 is in the initial state, the second via hole 22 in the protection door panel 201 is staggered with the two sets of first via holes 11 in the support seat 1, such that other parts of the protection door panel 201 can block the two sets of first via holes 11.

The shape of the second via hole 22 in the protection door 2 is determined based on the form of the plug bush to be blocked by the protection door 2. In some embodiments, the structure and the size of the second via hole 22 are consistent with the structure and the size of the first via hole 11 to be correspondingly communicated with the second via hole 22. For example, in the case that the plug bush is a two-pole plug bush, the second via hole 22 is strip-shaped, and the length direction of the second via hole 22 is consistent with the length direction of the jack of the socket. In the case that the plug bush is a three-pole plug bush, the second via hole 22 is in the shape of a tilt strip, and the tilt direction of the second via hole 22 is consistent with the tilt direction of the plug bush.

In some examples, the frame body 202 of the protection door 2 includes a first side portion, a second side portion, a third side portion and a fourth side portion which are sequentially connected end to end and are all fitted to form a first accommodating cavity capable of receiving the protection door panel 201. For any two side portions having a connection relationship, there is an angle between them, and the angle may be 90 degrees or less than 90 degrees.

For example, the frame body 202 of the protection door 2 corresponding to the two-pole plug bush may be rectangular, and the frame body 202 of the protection door 2 corresponding to the three-pole plug bush may be rectangular, trapezoidal or the like.

The protection door panel 201 and the frame body 202 are matched in structure. The protection door panel 201 is fixed to the top end of the frame body 202 in a detachable connection fashion. For example, an insertion groove is formed at the top of the frame body 202, and an inserting block is arranged on the bottom of the protection door panel 201, such that the inserting block is inserted into the insertion groove, thereby achieving the fixation of the protection door panel 201 onto the frame body 202.

In some implementations, as shown in FIG. 1, in combination with FIGS. 3 and 4, the socket protection door structure according to the embodiment of the present disclosure further includes: two sets of outer guide shafts 4 disposed on outer sides of two sets of side walls of the protection door 2 and extend in the second direction D2, respectively. The number of outer guide shafts in each set of outer guide shafts is one (as shown in FIGS. 3 and 4) or more.

In some embodiments, the outer guide shaft 4 is a cylinder, and the two sets of outer guide shafts 4 are disposed at middle positions of the outer sides of the side walls of the frame body 202. In this way, the two sides of the protection door 2 where the outer guide shafts 4 are disposed are symmetrically arranged, such that the protection door 2 can move with the outer guide shafts 4 as a movement center.

Figure 5:
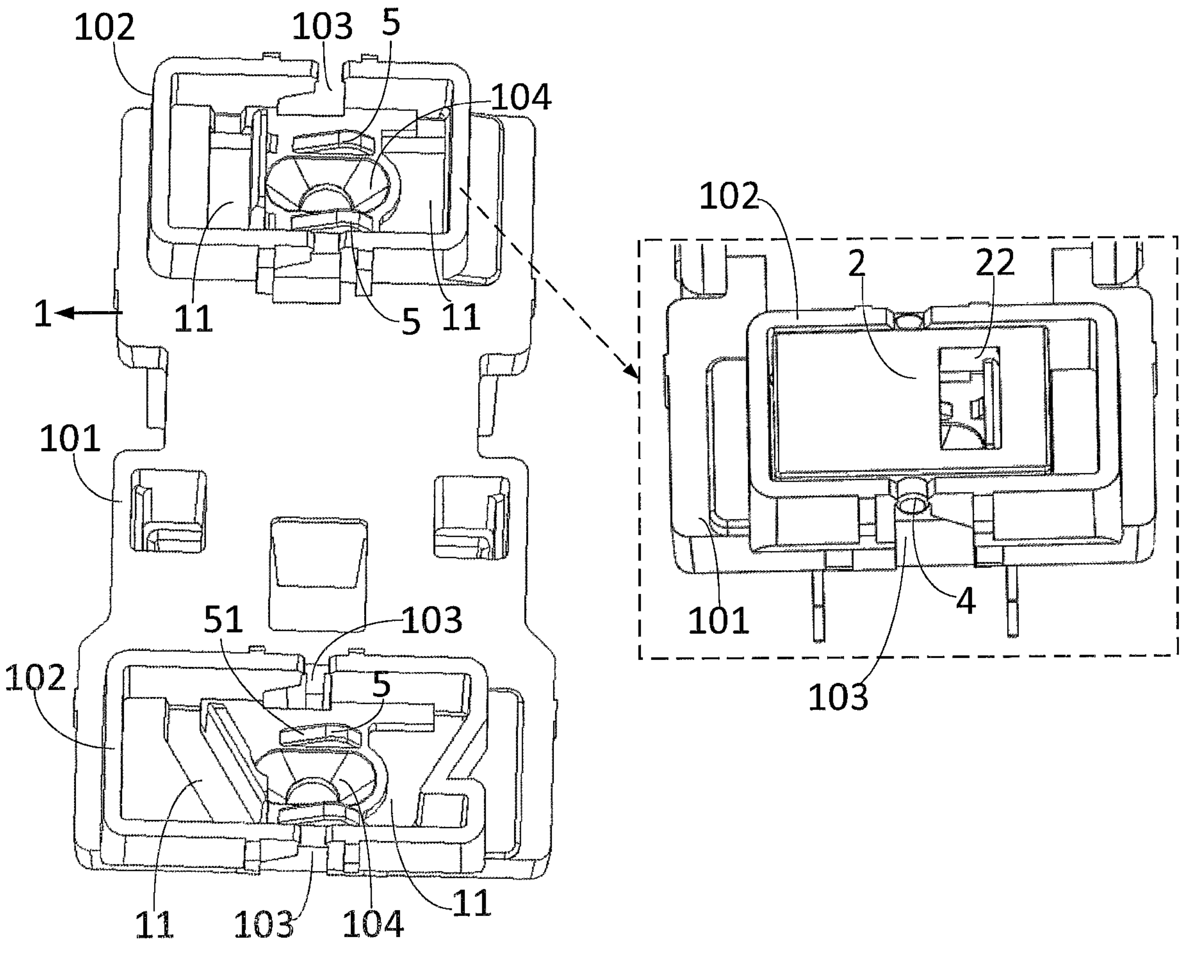
FIG. 5 is a schematic structural diagram of a support seat according to some embodiments of the present disclosure, in which a schematic diagram of an assembled relationship between a two-pole protection door and a corresponding support seat is also shown.

As shown in FIG. 5, the support seat 1 includes a bottom support portion 101 and a side circumference portion 102. The bottom support portion 101 is provided with the above two sets of first via holes 11 (the two sets of first via holes 11 are also disposed inside the side circumference portion 102). The bottom end of the side circumference portion 102 is connected to the bottom support portion 101. Guide slots 103 are provided on two sets of side walls, extending in the second direction D2, of the side circumference portion 102, and are configured to accommodate the outer guide shafts 4 and guide movement of the outer guide shafts 4 in the first direction D1 and the second direction D2.

In the embodiments of the present disclosure, the bottom support portion 101 of the support seat 1 can be configured to support not only the side circumference portion 102, but also a plug bush portion of the socket. Thus, the area of the bottom support portion 101 of the support seat 1 can be larger than the area of the side circumference portion 102. For example, in the case that the socket protection door structure is applied to a five-jack socket, the bottom support portion 101 of the support seat 1 may be designed to support both a two-pole plug bush and a three-pole plug bush; and meanwhile, two sides circumference portions 102 are designed to be two sets and correspond to the two-pole plug bush and the three-pole socket, respectively (the two sets of side circumference portions 102 are supported on one bottom support portion 101).

In some embodiments, the bottom support portion 101 is provided with a protection door assembling region at which the side circumference portion is disposed. The side circumference portion 102 includes a first side circumference section, a second side circumference section, a third side circumference section and a fourth side circumference section which are sequentially connected end to end and are all in fitted connection to form a second accommodating cavity. The second accommodating cavity is configured to receive the protection door 2 and the elastic reset member 3. There is an angle between any two sets of side circumference sections having a connection relationship, and for example, the angle is 90 degrees. All of the above side circumference sections may be straight plate sections, broken line plate sections, and plate sections with certain radians.

The area of the second accommodating cavity formed by the side circumference portion 102 in a surrounding fashion is larger than the area of the protection door 2. As shown in FIG. 2, the second accommodating cavity of the side circumference portion 102 further includes an initial assembling region 1021 of the protection door and a retreat region 1022 of the protection door, and the two sets of first via holes 11 in the bottom support portion 101 are both disposed in the initial assembling region 1021. When the protection door 2 is in the initial state, the protection door 2 is disposed in the initial assembling region 1021 of the protection door. When the protection door 2 moves from the initial state to the escaped state, part of the protection door 2 moves to the retreat region 1022 of the protection door, and the other part of the protection door 2 is still disposed in the initial assembling region 1021 of the protection door. One set of the first via holes 11 in the initial assembling region 1021 of the protection door is exposed due to the withdrawal of the protection door 2.

Guide slots 103 are provided on two side walls, extending in the second direction D2, of the side circumference portion 102, respectively, and are configured to accommodate the outer guide shafts 4 and guide movement of the outer guide shafts 4 in the first direction D1 and the second direction D2. That is, the above guide slots 103 are formed in the two sets of side circumference sections extending in the second direction D2, respectively. The guide slots 103 are designed to be two sets, and the number of the guide slots 103 in each set of guide slots is one or more.

The two sets of guide slots 103 correspond to the two sets of outer guide shafts 4 one by one. The outer guide shaft 4 runs through the corresponding guide slot 103, and can guide the movement of the outer guide shaft 4 in the first direction D1 and the second direction D2. That is, the guide slot 103 at least includes slot cavities distributed in the first direction D1 and in the second direction D2.

Figure 6:
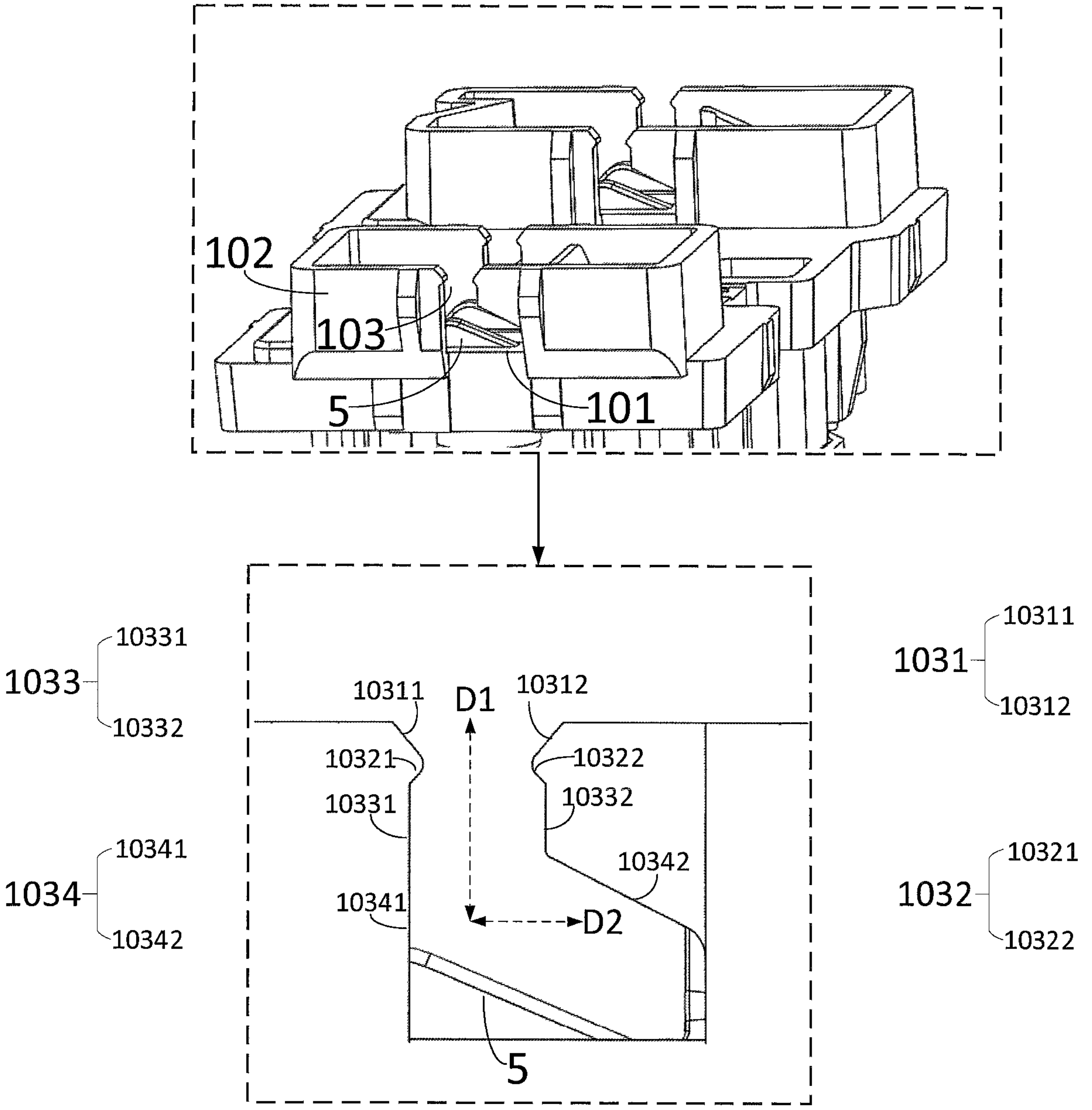
FIG. 6 is a schematic partial structure diagram of a support seat according to some embodiments of the present disclosure, in which a cross-sectional structure of a guide slot is also shown.

In some embodiments, as shown in FIG. 6, the guide slot 103 includes a guide section 1031, a limit section 1032, a first direction section 1033, and a second direction section 1034 which are sequentially in communication with one another, each of the guide section 1031, the limit section 1032 and the first direction section 1033 extends in the first direction D1, and the second direction section 1034 extends in the second direction D2.

The guide section 1031 is configured to guide the outer guide shaft 4 into the limit section 1032. The limit section 1032 is configured to limit the outer guide shaft 4 within the first direction section 1033. The first direction section 1033 is configured to guide the movement of the outer guide shaft 4 in the first direction D1. The second direction section 1034 is configured to guide the movement of the outer guide shaft 4 in the second direction D2.

In application, the outer guide shaft 4 is assembled under the guidance of the guide section 1031, and enters the first direction section 1033 through the limit section 1032. When the protection door 2 is in the initial state, the outer guide shaft 4 is always within the first direction section 1033 by the limit of the limit section 1032. When the protection door 2 is driven by pins to move, the outer guide shaft 4 enters the second direction section 1034 through the first direction section 1033, thereby achieving the movement of the protection door 2 in the first direction D1 and the second direction D2.

With this guide slot 103, the outer guide shaft 4 can be guided to move sequentially not only along the first direction section 1033 and the second direction section 1034, but also along the second direction section 1034 and the first direction section 1033.

Each of the guide section 1031, the limit section 1032, the first direction section 1033, and the second direction section 1034 has two opposite side walls at an interval which are provided by side walls of the side circumference portion 102 on the support seat 1 that are disposed on two sides of the guide slot 103.

In some embodiments, as shown in FIG. 6, the second direction section 1034 includes a first side wall 10341 and a second side wall 10342 which are spaced apart. The first side wall 10341 extends in the first direction D1 (in other words, the first side wall 10341 is provided vertically in the vertical direction). The second side wall 10342 is obliquely arranged and extends in the second direction D2 (in other words, the second side wall 10342 is obliquely arranged in the horizontal direction), and the distance between the first side wall 10341 and the top end of the second side wall 10342 is less than the distance between the first side wall 10341 and the bottom end of the second side wall 10342.

In the embodiments of the present disclosure, the second side wall 10342 is disposed on the right side of the first side wall 10341; and in this way, the protection door 2 only needs to move to the right when it moves to the escaped state. The second side wall 10342 may also be disposed on the left side of the first side wall 10341; and in this way, the protection door 2 only needs to move to the left when it moves to the escaped state.

When the protection door 2 moves from the initial state to the escaped state, or is reset from the escaped state to the initial state in a moving fashion, the second direction section 1034 can provide movement to the protection door 2 in the second direction D2. In this process, the second side wall 10342 of the second direction section 1034 can be in contact with the outer guide shaft 4 to guide the movement of the outer guide shaft 4, which is beneficial to promoting the movement of the protection door 2. Thus, the movement of the protection door 2 is smoother.

The first direction section 1033 extends in the vertical direction and the second direction section 1034 extends in the horizontal direction to form an L-shaped guide section. The L-shaped guide section is configured to restrict the outer guide shaft 4, and the outer guide shaft 4 can obliquely slide in the L-shaped guide section effectively, which can not only reduce a sliding stroke of the protection door 2 and friction resistance, but also reduce a requirement for an insertion action of a user. Thus, the adaptability to the insertion action requirement is wider, such that the plug can be easily inserted, an easy hand feeling during insertion is acquired, and a hand feeling of jamming during user experience is avoided.

In addition, through the fitted driving between the outer guide shaft 4 and the L-shaped guide section, a technical problem of wear of the plug on the driving surface can also be avoided, the requirement on the material characteristics of the protection door 2 is reduced, which is beneficial to reducing the costs.

In combination with the socket protection door structure according to the embodiments of the present disclosure, a normal opening process of the protection door 2 is described exemplarily as follows.

Figure 7:
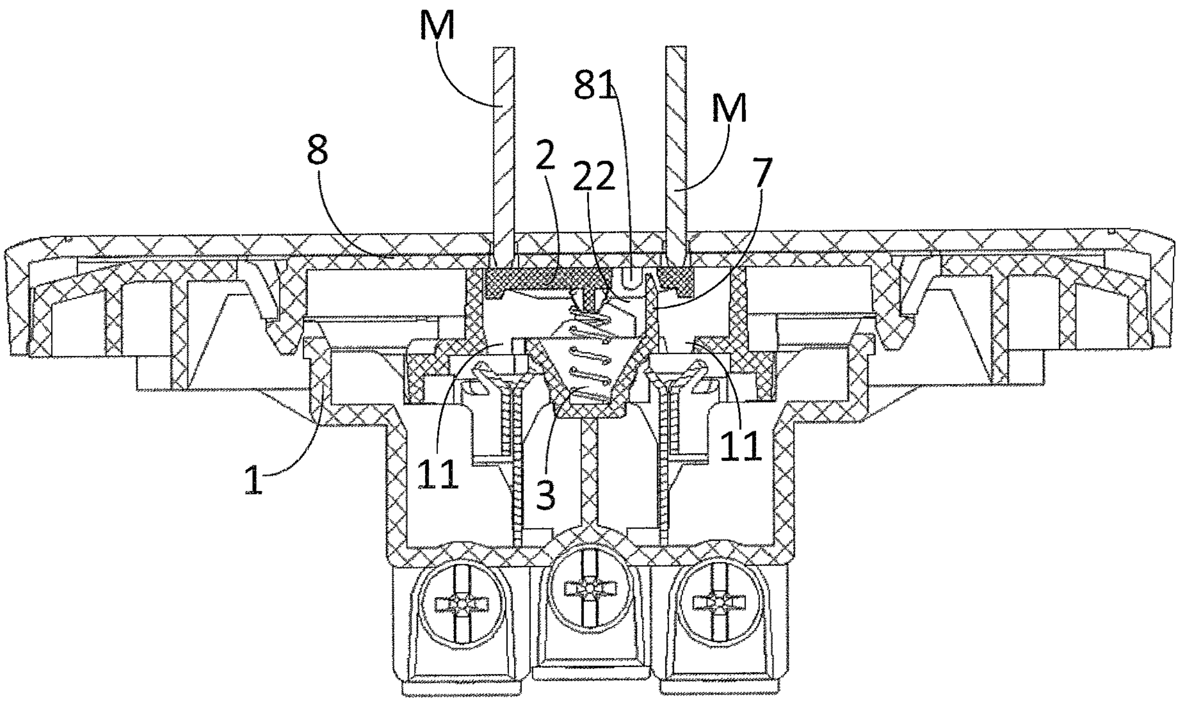
FIG. 7 is a schematic state diagram of a socket protection door structure in an initial state according to some embodiments of the present disclosure.
Figure 8:
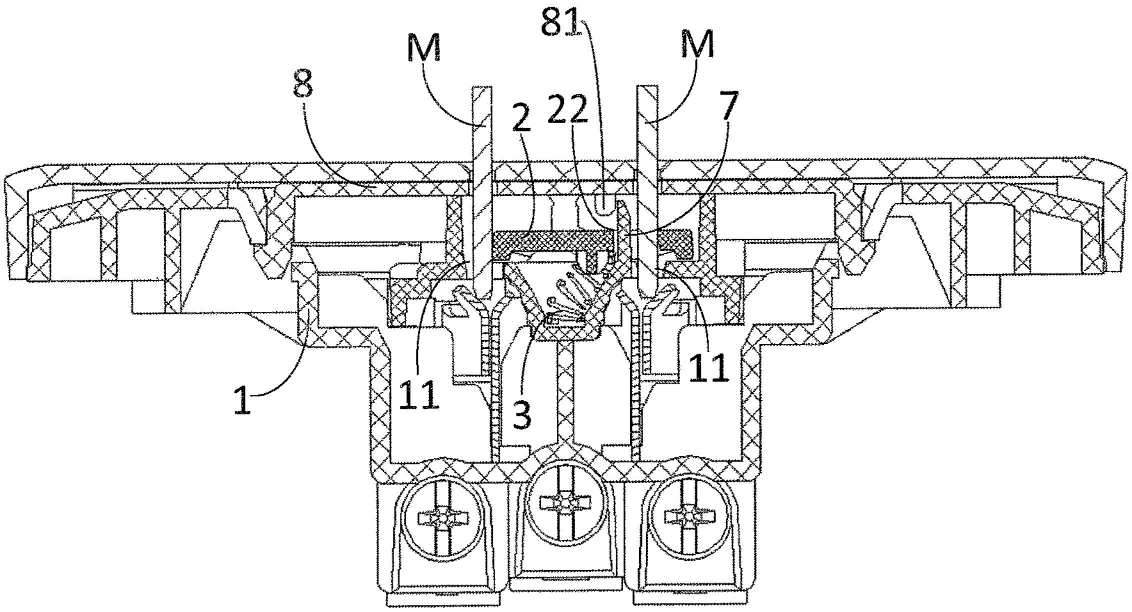
FIG. 8 is a schematic state diagram of a socket protection door structure in an escaped state according to some embodiments of the present disclosure.

As shown in FIGS. 5 to 7, when the protection door 2 opens normally, two pins M are required to insert from the N-pole jack and the L-pole jack, respectively; and under the thrust of the two pins M, the outer guide shaft 4 of the protection door 2 first moves within the first direction section 1033 in the first direction D1 and then enters the second direction section 1034 and moves in the second direction D2, and the protection door 2 moves to the escaped state. In this way, the two sets of first via holes 11 in the support seat 1 are exposed, such that the two pins M are correspondingly inserted into the corresponding first via holes 11 and finally into the corresponding plug bushes (see FIG. 8). As shown in FIG. 8, in the escaped state, a side wall of the frame body 202 of the protection door 2 abuts against a side wall of one of the pins M, and a side wall of the second via hole 22 of the protection door 2 abuts against a side wall of the other pin M.

For the reset process of the protection door 2, first, the two pins M are withdrawn from the plug bushes; then, the compressed elastic reset member 3 drives the protection door 2 to reset, such that the outer guide shaft 4 first slides along the second direction section 1034, and then enters the first direction section 1033 and is limited by the limit section 1032; and finally, the protection door 2 is reset to the initial state. In the initial state, the elastic reset member 3 pushes the protection door 2 to enable the top surface 21 of the protection door 2 to be closely attached to the top surface 21 of the protection door 2.

In the socket protection door structure according to the embodiments of the present disclosure, since the protection door 2 slides in the first direction D1 and the second direction D2, a small space occupation (a small volume) and a short sliding stroke are implemented, which is beneficial to simplifying the structure of the socket protection door structure, reducing the number of components (reduce materials), achieving less component parts, streamlining the assembling process of the protection door 2, and reducing the costs. In the related art, the five-jack socket at least includes fourteen parts, while the five-jack socket utilizing the socket protection door structure according to the embodiment of the present disclosure can only include nine parts, and thus has the advantages of multiple product functions, few product parts, and easy automatic production.

In some embodiments, an angle between the second side wall 10342 and the first direction D1 is greater than or equal to 17 degrees and less than or equal to 90 degrees, and for example, may be 25 degrees, 27 degrees, 30 degrees, 35 degrees, and the like. Within the range of the angle, it is beneficial to provide smoother movement for the protection door 2.

In some examples, the length of the second side wall 10342 is greater than 0 and less than or equal to 2.6 mm, and for example, is 1 mm, 1.5 mm, 2 mm, 2.5 mm, and the like. The length of the second side wall 10342 actually represents the sliding stroke of the protection door 2. By defining the sliding stroke as described above, it is beneficial to provide smoother movement for the protection door 2.

In particular, the angle between the second side wall 10342 and the first direction D1 is greater than or equal to 27 degrees and less than or equal to 90 degrees, and the sliding stroke of the protection door 2 is shorter than or equal to 2.6 mm, such that the sliding process of the protection door 2 can be smoother and the jamming feeling can be avoided. In addition, under this condition, it is beneficial to prolong the service life of the protection door 2, and at least ensure that the sliding reset service life of the protection door 2 can reach 40,000 times which is higher than that specified in National Standard of the People's Republic of China.

A range of the above tilt angle of the second side wall 10342 of the second direction section 1034 can be determined in the following way.

During the reset movement of the protection door 2, the outer guide shaft 4 first slides in the second direction section 1034. In other words, the outer guide shaft 4 and the second side wall 10342 of the second direction section 1034 are in contact with each other and have friction therebetween. In addition, the support seat 1 of the socket is generally made of polycarbonate, which is a material that meets specifications of National Standard of the People's Republic of China. The friction coefficient of polycarbonate is $\mu$=0.25-0.35. According to the following calculation equation: $F_{elastic force} \sin\theta - \mu F_{pressure}$ is greater than 0, only when the elastic force overcomes the friction can the protection door be reset. According to Newton's third law formula, the acting force is equal to the reaction force, namely, $F_{pressure}=F_{elastic\ force} \cos\theta$, and an angle between the second side wall 10342 and the first direction D1 is calculated to be greater than 17 degrees, namely, 17 degrees as a boundary value.

Further, considering of resistance arising from the unevenness on the ramp-shaped surface caused by the protection door 2 during the long-term sliding friction process, it is feasible to increase the angle between the second side wall 10342 and the first direction D1, and for example, the angle is 25 degrees, 27 degrees, 30 degrees, 35 degrees, and the like, such that the protection door 2 can be effectively reset in the long-term sliding period.

In the embodiments of the present disclosure, the bottom end of the side wall of the side circumference portion 102 where the second direction section 1034 is disposed is directly connected to the bottom support portion 101. As shown in FIG. 6, the bottom end of the side wall of the side circumference portion 102 where the second direction section 1034 is disposed may also be suspended. In other words, the guide slot 103 and the bottom support portion 101 are staggered in a third direction D3. The third direction D3 is a direction perpendicular to the second direction D2. The side wall of the side circumference portion 102 where the second direction section 1034 is disposed is proximal to the outer side, and the bottom of the second direction section is suspended; and the bottom support portion 101 is more proximal to the inner side.

The above design of the suspending bottom of the second direction section 1034 can effectively simplify a mold structure, reduce the manufacturing difficulty of the mold structure, and improve the mold production stability.

As for the limit section 1032 of the guide slot 103, in some implementations, as shown in FIG. 6, the limit section 1032 includes a third side wall 10321 and a fourth side wall 10322 which are symmetrically arranged. A gap exists between the third side wall 10321 and the fourth side wall 10322, and is the limit section 1032. The distance between the third side wall 10321 and the fourth side wall 10322 gradually increases in a direction proximal to the first direction section 1033, and the minimum distance between the third side wall 10321 and the fourth side wall 10322 is smaller than the outer diameter of the outer guide shaft 4.

In some embodiments, the third side wall 10321 and the fourth side wall 10322 may have the same shape, and for example, are arc-shaped walls, wedge-shaped walls, and the like. For example, the third side wall 10321 and the fourth side wall 10322 are symmetric circular arc-shaped walls, and the distance between the third side wall 10321 and the fourth side wall 10322 gradually decreases to a minimum in a direction proximal to the first direction section 1033, and then gradually increases from the minimum.

In this way, after the outer guide shaft 4 forcefully enters the limit section 1032 under the action of an external force, the outer guide shaft 4 cannot be freely separated from the limit section 1032 due to the limitation of the minimum distance between the third side wall 10321 and the fourth side wall 10322, such that the limit section 1032 can effectively limit the outer guide shaft 4, which is not only beneficial to keeping the initial state of the protection door 2, but also improving the assembling efficiency of the protection door 2.

For the first direction section 1033 of the guide slot 103, in some implementations, as shown in FIG. 6, the first direction section 1033 includes a fifth side wall 10331 and a sixth side wall 10332 which are opposite and parallel to each other. In other words, the distance between the fifth side wall 10331 and the sixth side wall 10332 is always the same, and both the fifth side wall 10331 and the sixth side wall 10332 extend in the first direction D1, such that the outer guide shaft 4 moves within the first direction section 1033 in the first direction D1.

For the guide segment 1031 of the guide slot 103, in some implementations, as shown in FIG. 6, the guide segment 1031 includes a seventh side wall 10311 and an eighth side wall 10312. The seventh side wall 10311 and an eighth side wall 10312 are symmetrically arranged, have a gap therebetween, and form the above-described guide segment 1031. Particularly, the seventh side wall 10311 and the eighth side wall 10312 are both obliquely arranged. The distance between the top end of the seventh side wall 10311 and the top end of the eighth side wall 10312 is greater than the distance between the bottom end of the seventh side wall 10311 and the bottom end of the eighth side wall 10312, and is also greater than the outer diameter of the outer guide shaft 4, such that the outer guide shaft 4 can easily enter the guide section 1031 to guide the assembling of the protection door 2 into the support seat 1.

In the socket protection door structure according to the embodiments of the present disclosure, the seventh side wall 10311, the third side wall 10321, the fifth side wall 10331, and the first side wall 10341 are sequentially connected and integrally formed. The eighth side wall 10312, the fourth side wall 10322, the sixth side wall 10332, and the second side wall 10342 are sequentially connected and integrally formed.

In some implementations, as shown in FIG. 5, the socket protection door structure further includes two sets of guide blocks 5 which are symmetrically arranged and are disposed on the top surface of the bottom support portion 101. The distribution direction of the two sets of guide blocks 5 is disposed in the above third direction D3. The number of guide blocks 5 in each set of guide blocks 5 is one (as shown in FIG. 5) or more.

The guide block 5 is provided with a guide surface 51. The guide surface 51 is obliquely arranged, extends in the second direction D2, and is configured to be in contact with the protection door 2 to guide the movement of the protection door 2. The movement of the protection door 2 referred to herein includes movement of the protection door 2 in the second direction D2 driven by two-pin, and tilting movement of the protection door 2 driven by single-pin.

In some embodiments, the guide block 5 is in contact with the bottom of the side wall of the protection door 2, namely, in contact with the bottom wall of the frame body 202 of the protection door 2. In other examples, the guide block 5 is in contact with the bottom of the panel of the protection door 2, namely, in contact with the bottom wall of the protection door panel 201 of the protection door 2. The position of the guide block 5 on the bottom support portion 101 may be adaptively adjusted based on a contact object of the guide block 5.

In some embodiments, the guide block 5 is of a plate-like structure, such as a triangular plate-like structure. Any one corner of the guide block 5 is in the shape of a smooth-transition circular arc, such that a surface on which one side of the triangular plate-like guide block 5 is disposed is fixed to the top surface of the bottom support portion 101, and a surface on which another side of the triangular plate-like guide block is disposed serves as the guide surface 51.

Taking an example in which the guide block 5 is in contact with the bottom of the side wall of the protection door 2, when the protection door 2 moves in the second direction D2 under the two-pin drive, the frame body 202 of the protection door 2 is enabled to be in contact with the guide surface 51. In this way, the movement of the protection door 2 in the second direction D2 is guided by the guide surface 51 to cooperate with the movement of the outer guide shaft 4 in the guide slot 103, and thus, the movement smoothness of the protection door 2 can be further improved, enabling the protection door 2 to move to the escaped state more easily.

Further, before the outer guide shaft 4 enters the second direction section 1034 from the first direction section 1033, the frame body 202 of the protection door 2 is enabled to be in contact with the guide surface 51 of the guide block 5 in advance, which is beneficial to prolong the service life of the protection door 2. In this case, the tilt angle of the second side wall 10342 of the second direction section 1034 is greater than or equal to the tilt angle of the guide surface 51, such that the frame body 202 of the protection door 2 can be in contact with the frame body 202 of the protection door 2 in advance, ensuring smooth opening of the protection door 2.

During the reset movement of the protection door 2, the outer guide shaft 4 is enabled to be in contact with the second side wall 10342 of the second direction section 1034 to guide the reset movement of the outer guide shaft 4 in the second direction D2, while the guide surface 51 of the guide block 5 is no longer in contact with the frame body 202 of the protection door 2.

Taking an example in which the guide block 5 is in contact with the bottom of the side wall of the protection door 2, when the protection door 2 moves in a tilted fashion under the single-pin drive, that is, when the driven side of the protection door 2 is tilted downwards, the bottom of the frame body 202 of the protection door 2 is enabled to be in contact with the guide surface 51, and the tilting movement of the protection door 2 is guided by the guide surface 51. Specifically, the protection door moves in a tilting-plate-type fashion by using the guide surface 51 as a stress point, such that the movement of the protection door 2 is smoother.

In some implementations, as shown in FIG. 5 or 6, the socket protection door structure further includes two sets of guide blocks 5 which are symmetrically arranged and are disposed on the top surface of the bottom support portion 101. The distribution direction of the two sets of guide blocks 5 is in the above third direction D3. The guide block 5 is provided with a guide surface 51 which is obliquely arranged and extends in the second direction D2.

As shown in FIG. 3 or 4, the socket protection door structure according to the embodiment of the present disclosure further includes two sets of inner guide shafts 9. The two sets of inner guide shafts 9 are disposed on the protection door 2, and correspond to the two sets of guide blocks 5 one by one. As shown in FIG. 9, the inner guide shaft 9 is configured to be in contact with the guide surface 51 of the corresponding guide block 5 to guide the movement of the protection door 2. The movement of the protection door 2 described herein includes the movement of the protection door 2 in the second direction D2 under the two-pin drive and the tilting movement of the protection door 2 under the single-pin drive. The number of inner guide shafts 9 in each set of inner guide shafts is one (as shown in FIGS. 3 and 4) or more.

The inner guide shaft 9 is in the shape of an arcuate column or a cylinder, the length direction of the inner guide shaft 9 is the same as that of the outer guide shaft 4, and the circumferential direction of the inner guide shaft 9 is the same as that of the outer guide shaft 4. In this way, the movement of the inner guide shaft 9 on the guide surface 51 of the guide block 5 is smoother.

In some embodiments, as shown in FIG. 3, the protection door 2 includes a protection door panel 201 and a frame body 202. The protection door panel 201 is provided with the above top surface 21, and is connected to the top end of the frame body 202, and the frame body 202 is movably connected to the support seat 1. The inner guide shafts 9 are disposed on inner sides of two side walls, extending in the second direction D2, of the frame body 202.

By disposing the inner guide shafts 9 inside the two side walls, extending in the second direction, of the frame body 202, an internal space of the protection door 2 can be reasonably utilized by the inner guide shafts 9, which is conducive to the miniaturization and thinness of the structure of the protection door 2.

The outer guide shafts 4 and the inner guide shafts 9 are disposed on the outer sides and the inner sides of the side walls of the frame body 202, respectively, and the outer guide shaft 4 and the inner guide shaft 9 disposed on the same side may correspond to each other one by one. This structure is beneficial to not only manufacturing, but also enhancing the strength of the protection door 2.

In some embodiments, when the protection door 2 moves in the second direction D2 under the two-pin drive, the inner guide shaft 9 is enabled to be in contact with the guide surface 51. In this way, the movement of the protection door 2 in the second direction D2 is guided by the guide surface 51 to cooperate with the movement of the outer guide shaft 4 in the guide slot 103, and thus, the movement smoothness of the protection door 2 can be further improved, enabling the protection door 2 to move to the escaped state more easily (not shown in the figure).

Further, before the outer guide shaft 4 enters the second direction section 1034 from the first direction section 1033, the inner guide shaft 9 is enabled to be in contact with the guide surface 51 of the guide block 5 in advance, which is beneficial to prolong the service life of the protection door 2. In this case, the tilt angle of the second side wall 10342 of the second direction section 1034 is greater than or equal to the tilt angle of the guide surface 51, such that the inner guide shaft 9 can be in contact with guide surface 51 in advance, ensuring smooth opening of the protection door 2.

During the reset movement of the protection door 2, the outer guide shaft 4 is enabled to be in contact with the second side wall 10342 of the second direction section 1034 to guide the reset movement of the outer guide shaft 4 in the second direction D2, while the guide surface 51 of the guide block 5 is no longer in contact with the inner guide shaft 9.

In some embodiments, as shown in FIG. 9, when the protection door 2 moves in a tilted fashion under the single-pin drive, that is, when the driven side of the protection door 2 is tilted downwards, the inner guide shaft 9 is enabled to be in contact with the guide surface 51, and the tilting movement of the protection door 2 is guided by the guide surface 51. Specifically, the protection door moves in a tilting-plate-type fashion by using the guide surface 51 as a stress point, such that the movement of the protection door 2 is smoother.

It can be seen that the cooperation between the inner guide shaft 9 and the guide block 5 promotes the movement of the protection door 2 from the first direction D1 to the second direction D2, and the cooperation between the outer guide shaft 4 and the second direction section 1034 promotes the reset movement of the protection door 2 from the second direction D2 to the first direction D1, which is more conducive to prolonging the service life of the protection door 2. Moreover, the movement of the protection door 2 is promoted by the contact between the inner guide shaft 9 and the guide surface 5. In this contact, a contact area and a corresponding friction force are both smaller, which is beneficial to improving the movement smoothness of the protection door 2 and improving the user experience.

In particular, in combination with the staggered arrangement between the guide slots 103 and the bottom support portion 101, a stress point of the protection door 2 is enabled to be more inclined to the bottom support portion 101 of the support seat 1 when the protection door 2 moves to the escaped state, so as to disperse the stress of the outer guide shaft 4 and reduce the requirement on the structural rigidity of the protection door 2. Thus, the cooperation between the outer guide shafts 4 and the guide slots 103 can be easier, and the protection door is less liable to deform. In summary, the prolonging of the service life of the socket protection door structure is facilitated.

In addition, the method of transferring the stress point to the bottom support portion 101 of the support seat 1 further facilitates the reduction of the thickness of the protection door 2. Thus, the space generated by the reduced thickness of the protection door 2 is correspondingly transferred to the socket on the premise that a plug bush in contact with a plug meets the requirements of H1 of National Standard of the People's Republic of China, such that the maximum thickness of the decorative protection door panel 201 of the socket can be less than or equal to 4 mm.

In some implementations, as shown in FIG. 3, the frame body 202 of the protection door 2 includes a side frame 2021 and a panel rack 2022 disposed inside the side frame 2021. A via hole with the same structure as the second via hole 22 is further formed in the bottom wall of the panel rack 2022. Two sets of escape slots 2023 are further arranged on the bottom surface of the panel rack 2022, and correspond to the two sets of guide blocks 5 one by one. The escape slot 2023 at least receives the top of the corresponding guide block 5 when the protection door 2 moves in the second direction D2.

The escape slot 2023 is disposed on the surface, facing the guide block 5, of the panel rack 2022. The design of the escape slot 2023 facilitates the reduction of the thickness of the protection door 2 and further the reduction of the thickness of the socket. Thus, for example, the thickness of the external protection door panel 201 of the socket is less than or equal to 4 mm, which also reduces the manufacturing costs of the socket.

In some embodiments, when the protection door 2 moves in the second direction D2, the escape slot 2023 can receive the top of the guide block 5 (because the top of the guide block 5 corresponds to the maximum height of the guide block 5), and further, receives the entire guide block 5. In this way, the structure of the escape slot 2023 is the same as that of the guide block 5, such that the guide block 5 can be embedded into the escape slot 2023 in an exactly matching fashion.

In some embodiments, before the outer guide shaft 4 of the protection door 2 enters the second direction section 1034, the inner guide shaft 9 is caused first to be in contact with the guide surface 51 of the guide block 5, such that the inner guide shaft 9 can move in the second direction D2 along the guide surface 51 to promote the movement of the protection door 2. Further, in this process, at least the top portion of the guide block 5 is enabled to enter the corresponding escape slot 2023.

In the embodiments of the present disclosure, the elastic reset member 3 is disposed between the support seat and the protection door 2. When the protection door 2 is in the initial state of movement, the elastic reset member 3 is in a naturally extended state. When the protection door 2 is in the escaped state, the elastic reset member 3 is compressed to an elastic compression state by the moving protection door 2. Thus, when the protection door 2 in the escaped state is no longer subjected to the external force, the elastic reset member 3 is reset to enable the protection door 2 to reset to the initial state.

In some implementations, as shown in FIG. 3, the socket protection door structure according to the embodiments of the present disclosure further includes a fixing block 6 disposed on the bottom surface of the protection door 2, particularly on the bottom surface of the panel rack 2022 of the protection door 2. The fixing block 6 is connected to the elastic reset member 3. For example, the fixing block 6 and the elastic reset member 3 are connected in such a way that the two can keep a stable assembling relationship, such that the protection door 2 and the elastic reset member 3 can be assembled to the support seat 1 together, thereby achieving stable assembling and avoiding a problem of reduced assembling efficiency caused by the separation of the elastic reset member 3 from the protection door 2 in the assembling process.

In some embodiments, the fixing block 6 is movably connected to the elastic reset member 3. That is, the elastic reset member 3 not only is stably assembled onto the fixing block 6, but also can move axially to some extent along the fixing block 6.

For example, the elastic reset member 3 is a compression spring, and the top end of the elastic reset member 3 sleeves the fixing block 6. The elastic reset member and the fixing block are in clearance fit each other and achieve relative fixation through friction.

As an example, the fixing block 6 is a cylinder matched with the compression spring, and is in interference fit with the compression spring, such that the elastic reset member 3 can be fixed onto the fixing block 6 only by the friction between the fixing block and the compression spring, which is beneficial to both the fixed connection and the disassembling between the fixing block and the compression spring.

As another example, the fixing block 6 includes a cylindrical section, and a conical section which is at the bottom end of the cylindrical section and which is configured to facilitate the sleeving of the cylindrical section by the compression spring. The cylindrical section and the compression spring are in interference fit with each other, such that the elastic reset member 3 can be fixed onto the cylindrical section of the fixing block 6 only by the friction between the cylindrical section and the compression spring.

In order to reduce the weight of the protection door 2, a plurality of notches are formed in the fixing block 6. The plurality of notches is uniformly arranged in the peripheral direction of the fixing block 6, which not only does not affect the clearance fit between the fixing block 6 and the compression spring, but also achieves the purpose of reducing the weight.

The elastic reset member 3 is fixed onto the fixing block 6 on the protection door 2, in addition, the length direction of the elastic reset member 3 is in the first direction D1, and then, the protection door 2 with the elastic reset member 3 is wholly mounted in the support seat 1. In this way, in the case that the protection door 2 is mounted into the support seat 1, the elastic reset member 3 is in a naturally extended state; and in the case that the protection door 2 is mounted on the support seat 1, there is no rebound force which is generated by the compression of the elastic reset member 3, thereby avoiding the problem of lower mounting efficiency caused by the bounced the protection door.

In the embodiments of the present disclosure, the fixing block 6 is disposed at the center of the bottom surface of the protection door 2. In this way, the back of the protection door 2 is supported by a vertically supported elastic reset member 3 (here the first direction D1 is defined as the vertical direction), and thus, the protection door can be kept in a horizontal state in the initial state. In the case that the single pin is inserted, the protection door 2 can move in a tilting-plate-type fashion, such that a problem of unsmooth sliding of the protection door 2 due to tilt is solved, and the protection door 2 can rotate at multiple angles and can be normally reset.

Further, as shown in FIGS. 1 and 10, the support seat 1, in particular the bottom support portion 101 of the support seat 1, is provided with a limit groove 104 for accommodating the bottom end of the elastic reset member 3 and allowing the elastic reset member 3 to correspondingly move along with the moving protection door 2. In this way, even if the elastic reset member 3 is deflected during the movement of the protection door 2, the elastic reset member 3 is prevented from failure due to deflection transition.

In some embodiments, as shown in FIG. 10, the limit groove 104 includes a first groove wall 1041 and a second groove wall 1042 which are symmetrically arranged and are distributed in the second direction D2. In other words, the first groove wall 1041 and the second groove wall 1042 are distributed in the distribution direction of the two sets of first via holes 11.

At least one of the first groove wall 1041 and the second groove wall 1042 is obliquely arranged and extends in the second direction D2 to receive the elastic reset member 3 moving with the protection door 2. In some embodiments, the first groove wall 1041 and the second groove wall 1042 have the same structure, are both titled, and have opposite tilt directions; and meanwhile, both the first groove wall 1041 and the second groove wall 1042 extend in the second direction D2.

Taking the first groove wall 1041 as an example, the angle between the first groove wall 1041 and the first direction D1 is enabled to be 25 degrees to 35 degrees, and for example, 30 degrees, and the tilt angle of the first groove wall 1041 is slightly greater than the deflection displacement of the elastic reset member 3. In this way, in the case that the elastic reset member 3 is twisted and deformed by force, the first groove wall 1041 or the second groove wall 1042 supports the twisted and deformed elastic reset member 3, and more closely fit the deformation of the elastic reset member 3, such that the elastic reset member 3 can be smoothly supported, fatigue can be alleviated, and the service life of the elastic reset member 3 can be prolonged.

In addition to the first groove wall 1041 and the second groove wall 1042 described above, the limit groove 104 further includes a third groove wall and a fourth groove wall which are symmetrically arranged. The first groove wall 1041, the third groove wall, the second groove wall 1042 and the fourth groove wall are sequentially connected end to end to form the limit groove 104 in a fitting fashion; and the third groove wall and the fourth groove wall are also obliquely arranged accordingly to fit the obliquely arranged first and second groove walls 1041 and 1042.

In some embodiments, the first groove wall 1041 and the second groove wall 1042 are arcuate in their width directions (namely, the directions perpendicular to their top ends and bottom ends), such that the first groove wall 1041 and the second groove wall 1042 are arcuate walls. Accordingly, the third groove wall and the fourth groove wall are of linear flat structures in their width directions, such that the third groove wall and the fourth groove wall are flat walls.

Therefore, the width of the limit groove 104 according to the embodiments of the present disclosure gradually decreases from its top end to its bottom end; and the maximum width of the limit groove 104 is greater than the diameter of the elastic reset member 3, which is determined by the deflection displacement of the elastic reset member 3. The minimum width of the limit groove 104 is smaller than the diameter of the elastic reset member 3. In other words, the bottom end of the limit groove 104 is designed in the shape of a circular hole to accommodate and define the elastic reset member 3, so as to limit the elastic reset member 3 by the limit groove 104. The elastic reset member 3 is limited in the limit groove 104 of this structure, such that the elastic reset member 3 can be effectively prevented from failure due to deflection transition in the deflecting process.

In some implementations, as shown in FIGS. 9 and 10, the socket protection door structure according to the embodiments of the present disclosure further includes a stopper 7 disposed on the bottom support portion 101 of the support seat 1. The top end of the stopper 7 is disposed in the second via hole 22 in the protection door panel 201 of the protection door 2. When the protection door 2 is tilted to one side under single-pin insertion, the stopper 7 can abut against the wall of the second via hole 22.

In some embodiments, the stopper 7 is in the shape of a flat plate. When the protection door 2 is tilted towards the insertion side under single-pin insertion, the stopper 7 can abut against the wall of the second via hole 22 in the protection door 2 to stop the rotating protection door 2, such that the protection door 2 cannot move in the second direction D2, but still plays a role in protecting the plug bush, thereby achieving the function of preventing the insertion of the single pin. In addition, the stopper 7 is provided to facilitate the smooth reset of the tilted protection door 2, and the aesthetics is improved by using the stopper to block the elastic reset member 3 in sight.

In order to improve the reliability of the socket protection door structure in preventing the single pin insertion, as shown in FIG. 9, the socket protection door structure according to the embodiments of the present disclosure further includes two sets of first stop blocks 12 and two sets of second stop blocks 13. The two sets of first stop blocks 12 correspond to the two sets of second stop blocks 13 one by one, and are disposed on two sides, extending in the third direction D3, of the protection door 2, respectively. That is, the two sets of first stop blocks 12 are distributed in the distribution direction of the N-pole plug bush and the L-pole plug bush (in other words, the distribution direction of the two sets of first stop blocks 12 is the same as that of the two sets of first via holes 11). The two sets of second stop blocks 13 are disposed on side walls of the two first via holes 11, respectively. The first stop block 12 tilted in a direction proximal to the first via hole 11 cooperates with the corresponding second stop block 13 to achieve a stop when the protection door 2 is tilted towards one side under single-pin insertion. The third direction D3 is a direction perpendicular to the second direction D2.

In the embodiments of the present disclosure, the limit groove 104 for accommodating the elastic reset member 3 is disposed between the two sets of first via holes 11, such that one side wall of the first via hole 11 is proximal to the limit groove 104, and is referred to as a first stop wall herein. The other side wall, opposite the first stop wall, of the first via hole 11 is referred to as the second stop wall herein. The second stop block 13 is disposed on the first stop wall, and correspondingly, the second stop block 13 cooperates with the inner side of the first stop block 12 proximal to the limiting slot 104 to achieve a stop.

In the embodiments of the present disclosure, one side wall of the first via hole 11 is proximal to the middle position of the support seat 1, and is referred to as the first stop wall herein. The other side wall, opposite the first stop wall, of the first via hole 11 is herein referred to as the second stop wall. The second stop block 13 is disposed on the first stop wall, and correspondingly, the second stop block 13 cooperates with the inner side of the first stop block 12 proximal to the middle position of the protection door 2 to achieve a stop.

The second stop block 13 may also be disposed on the second stop wall, and correspondingly, the second stop block 13 cooperates with the outer side, distal to the middle position of the protection door 2, of the first stop block 12 to achieve a stop. The above two conditions can achieve the purpose of the stop through cooperation between the first stop block 12 and the second stop block 13.

As shown in FIG. 9, when the single pin is inserted from one side into the surface of the protection door 2, the protection door 2 obliquely moves, such that the first stop block 12 tilted towards a direction proximal to the first via hole 11 cooperates with the second stop block 13 on the side wall of the first via hole 11 to achieve a stop. In this way, the first stop block 12 can stop at the first via hole 11, thereby stopping the tilted protection door 2. Thus, the protection door 2 cannot move in the second direction D2, but still plays a role in protecting the plug bush. The single pin cannot enter the first via hole 11, achieving the function of preventing the insertion of the single pin.

FIG. 3 is a schematic structural diagram of a three-pole protection door according to some embodiments of the present disclosure, in which A shows the front structure of the protection door, B shows the back structure of the protection door, and C shows a frame body structure in the protection door except a panel. FIG. 4 is a schematic structural diagram of a two-pole protection door according to some embodiments of the present disclosure, in which a front structure and a back structure of the protection door are shown, respectively.

In some implementations as shown in FIG. 3 or 4, the protection door 2 includes a protection door panel 201 and a frame body 202. The frame body 202 is movably connected to the support seat 1. The protection door panel 201 is connected to the top end of the frame body 202, and is provided with a top surface 21 and a second via hole 22. The second via hole 22 is configured to be in corresponding communication with one set of the first via holes 11 as exposed.

The two sets of first stop blocks 12 are disposed at bottom ends of two sets of side walls, extending in the third direction D3, of the frame body 202. Since the first stop blocks 12 are disposed on two sides, extending in the third direction D3, of the frame body 202, namely, on the left and right sides of the frame body 202, when a single pin is inserted, either the left side of the protection door 2 is tilted such that the first stop block 12 on the left side is disposed in the first via hole 11 in the left side, or the right side of the protection door 2 is tilted such that the first stop block 12 on the right side is disposed in the first via hole 11 in the right side. In this way, the first stop block 12 on the left or right side of the frame body 202 of the protection door 2 can cooperate with the second stop block 13 in the corresponding first via hole 11 to achieve a stop, and further, the protection door 2 tilted to one side is stopped, such that the effect of preventing the insertion of the single pin is achieved.

In the embodiments of the present disclosure, each set of first stop blocks 12 includes one first stop block 12 or a plurality of, for example, two or three first stop blocks 12. Accordingly, the number of second stop blocks 13 is the same as the number of first stop blocks 12, and the second stop blocks cooperate with the corresponding first stop blocks one by one to achieve a stop.

As shown in FIG. 3 or 4, the protection door panel 201 is provided with a second via hole 22. When the protection door 2 is in the initial state, the second via hole 22 in the protection door panel 201 is staggered with the two sets of first via holes 11 in the support seat 1, such that other parts of the protection door panel 201 can block the two sets of first via holes 11. The shape of the second via hole 22 in the protection door 2 is determined based on the form of the plug bush to be blocked by the protection door 2. For example, in the case that the plug bush is a two-pole plug bush, the second via hole 22 is strip-shaped, and the length direction of the second via hole 22 is consistent with the length direction of the jack of the socket. In the case that the plug bush is a three-pole plug bush, the second via hole 22 is in the shape of a tilt strip, and the tilt direction of the second via hole 22 is consistent with the tilt direction of the plug bush.

Figure 11:
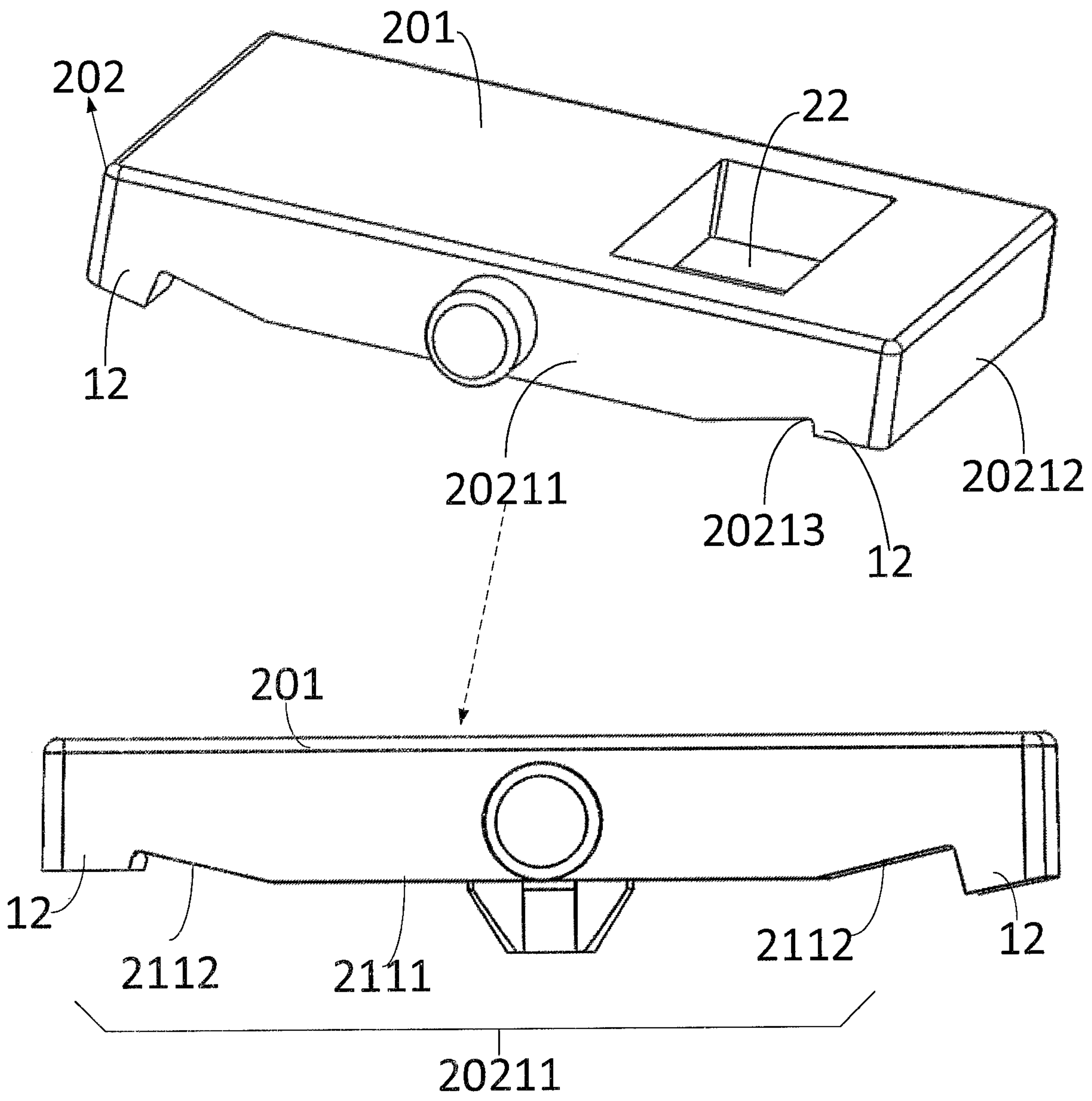
FIG. 11 is a schematic structural diagram of a two-pole protection door according to some embodiments of the present disclosure.

In some implementations, as shown in FIG. 11, the frame body 202 includes two sets of first side plates 20211 arranged oppositely and two sets of second side plates 20212 arranged oppositely. Two ends of the first side plate 20211 are vertically connected to two ends of the second side plate 20212, respectively. The second side plates 20212 extend in the third direction D3. The first stop block 12 is disposed at the bottom end of the second side plate 20212. A stop slot 20213 is provided between the first stop block 12 and the first side plate 20211 in a fitting fashion, and is configured to accommodate the second stop block 13.

The structure of the second stop block 13 is such that it can at least enter the stop slot 20213 to achieve the stop by cooperation. For example, the second stop block 13 may be provided by the side wall of the first via hole 11 or may be independently connected to the side wall of the first via hole 11, and the second stop block 13 may be, for example, a rectangular block. Each set of first stop blocks 12 includes two first stop blocks 12 disposed on two sides of the bottom end of the second side plate 20212. The number of first stop blocks 12 in each set of first stop blocks is one or more.

This arrangement of both the first stop block 12 and the stop slot 20213 further facilitates simplification of the structure of the protection door 2 on the premise of achieving the effective stop.

In the embodiments of the present disclosure, the first stop block 12 and the second side plate 20212 are connected in an integrally-formed fashion. It may also be considered that the bottom of the second side plate 20212 serves as the first stop block 12, and such an arrangement is not only beneficial to simplifying the structure of the protection door 2, but also beneficial to enhancing the strength of the protection door 2.

In some other embodiments, the first stop block 12 may be independent of the second side plate 20212, such that the first stop block 12 is connected to the bottom end of the second side plate 20212. This connection may be, for example, a clamping connection, a connection with screws, and the like.

In some implementations, as shown in FIG. 11, the bottom wall of the first side plate 20211 includes a main body section 2111, and two sets of tilt sections 2112 disposed on two sides of the main body section 2111. A first end of each tilt section 2112 is connected to the main body section 2111, a second end of the tilt section 2112 is connected to the first stop block 12, and the second end of the tilt section 2112 is more proximal to the protection door panel 201 relative to the first end. With this arrangement, a stop space of the stop slot 20213 can be enlarged, which is beneficial to improving the stop effect.

In some implementations, as shown in FIG. 1, the support seat 1 includes a bottom support portion 101 and a side circumference portion 102. The bottom support portion 101 is provided with the two sets of first through holes 11, and the bottom end of the side circumference portion 102 is connected to the bottom support portion 101.

As shown in FIGS. 9 and 10, the socket protection door structure further includes a stopper 7 disposed on the bottom support portion 101, and the top end of the stopper 7 is disposed in the second via hole 22 in the protection door panel 201. When the protection door 2 is tilted under single-pin insertion, the stopper 7 can abut against the wall of the second via hole 22.

In some embodiments, the stopper 7 is in the shape of a flat plate. When the protection door 2 is tilted towards the insertion side under single-pin insertion, the stopper 7 can abut against the wall of the second via hole 22 in the protection door 2 to stop the rotating protection door 2, such that the protection door 2 cannot move in the second direction D2, but still plays a role in protecting the plug bush, further improving the effect of preventing the insertion of the single pin. In addition, the stopper 7 is provided to facilitate the smooth reset of the tilted protection door 2, and the aesthetics is improved by using the stopper to block the elastic reset member 3 in sight.

In combination with the above structure, the working principle of preventing the insertion of the single pin of the socket protection door structure according to the embodiments of the present disclosure is exemplarily described below.

Figure 12:
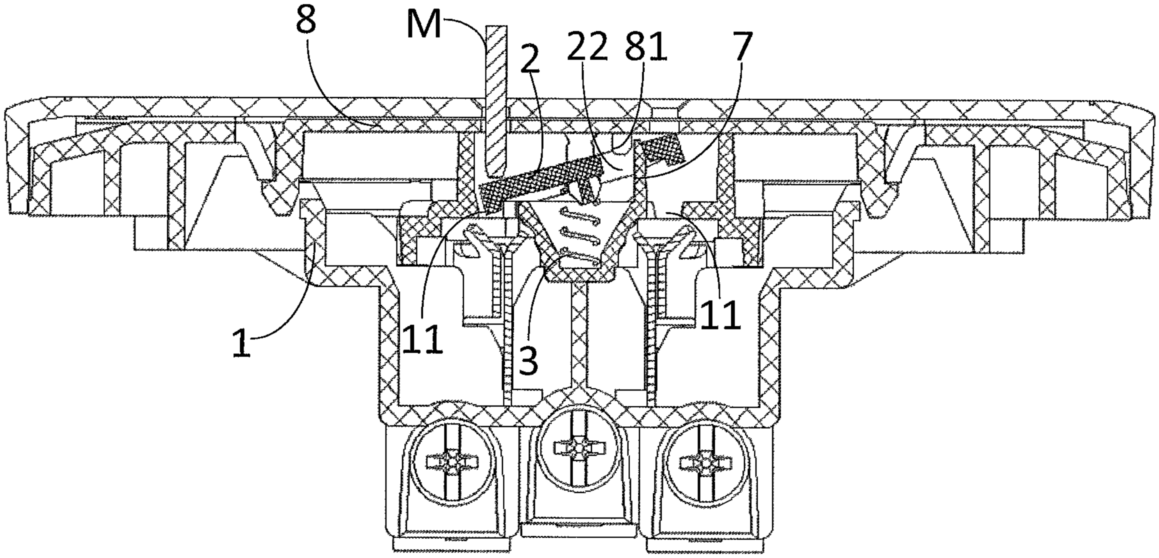
FIG. 12 is a schematic state diagram of a socket protection door structure when a single plug is inserted from the left side according to some embodiments of the present disclosure.
Figure 13:
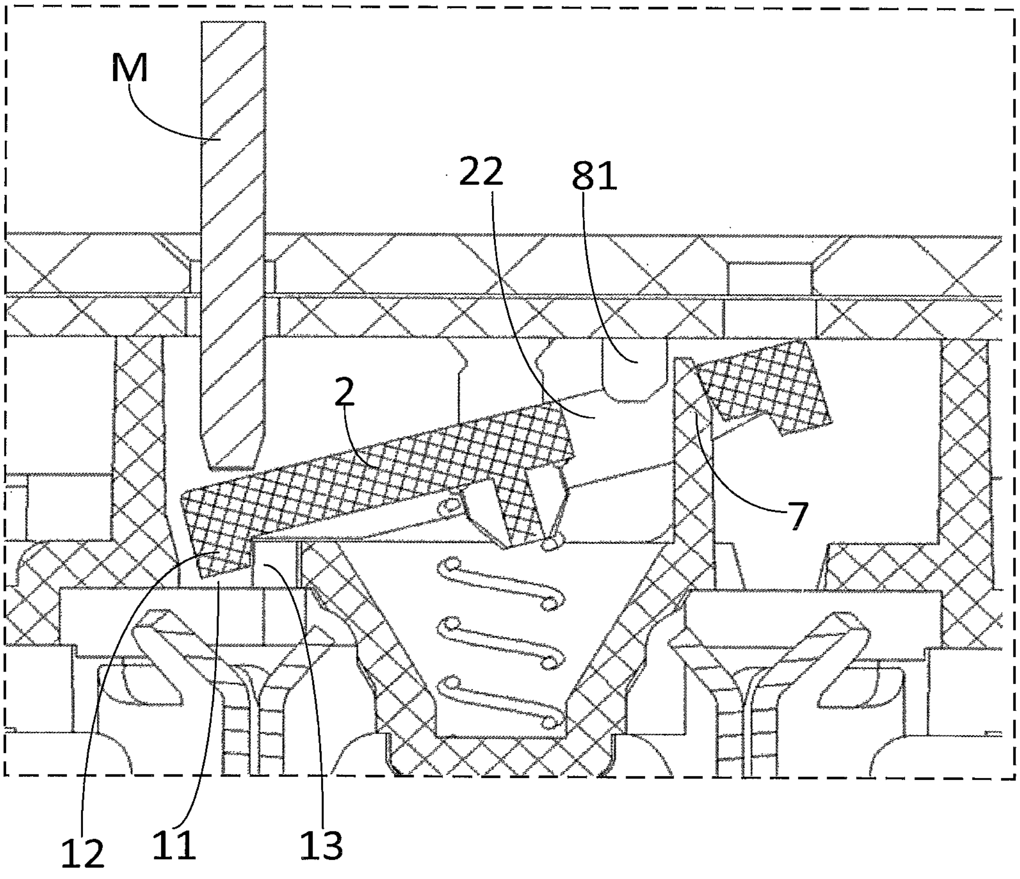
FIG. 13 is a partially enlarged view based on FIG. 12 according to some embodiments of the present disclosure.

As shown in FIG. 12, a thrust is applied to the left side of the protection door 2 in the initial state under the single-pin insertion, the left end of the protection door 2 rotates downward, such that the left side of the protection door 2 is tilted towards a direction more proximal to the bottom support portion 101, namely, the left side of the protection door 2 is more proximal to the first via hole 11 on the left side. In this way, the first stop block 12 on the left side of the protection door 2 enters the first via hole 11 on the left side, such that the first stop block 12 cooperates with the second stop block 13 in the first via hole 11 to achieve a stop. A process of this stop is as shown in FIG. 13, in which the second stop block 13 enters the stop slot 20213 formed by the first stop block 12 on the protection door 2 to form a concave-convex positioning support, such that the protection door 2 is stopped at the same time to block and protect the first via hole 11 disposed on the left side. Thus, the single pin cannot pass through the protection door 2 to enter the plug bush, thereby achieving the purpose of preventing the insertion of the single pin. When the single-pin is pulled out, the protection door 2 is reset in a moving fashion to the initial state by the elastic reset member 3.

Figure 14:
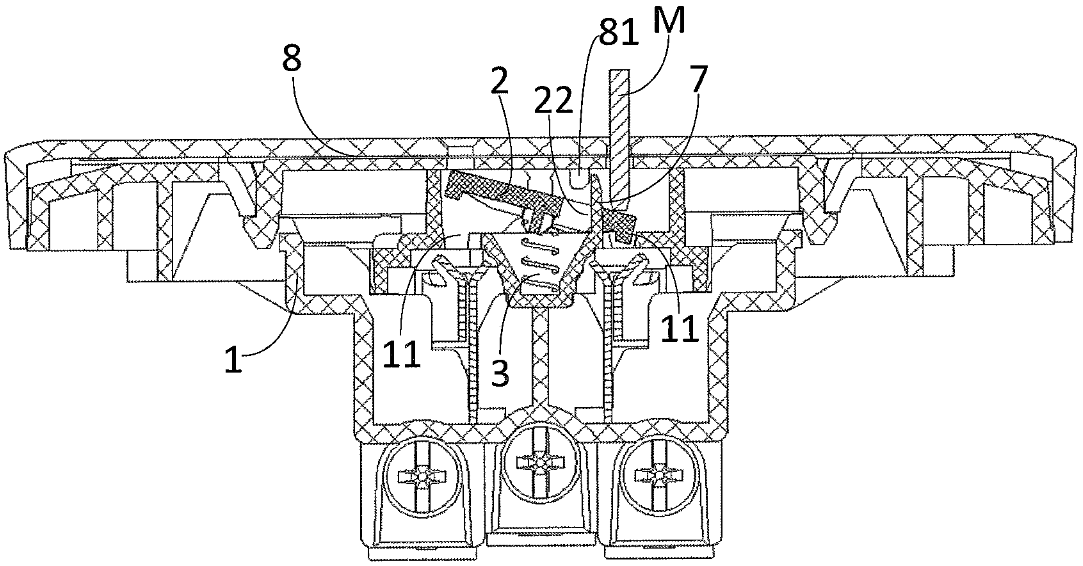
FIG. 14 is a schematic state diagram of a socket protection door structure when a single plug is inserted from the right side according to some embodiments of the present disclosure.
Figure 15:
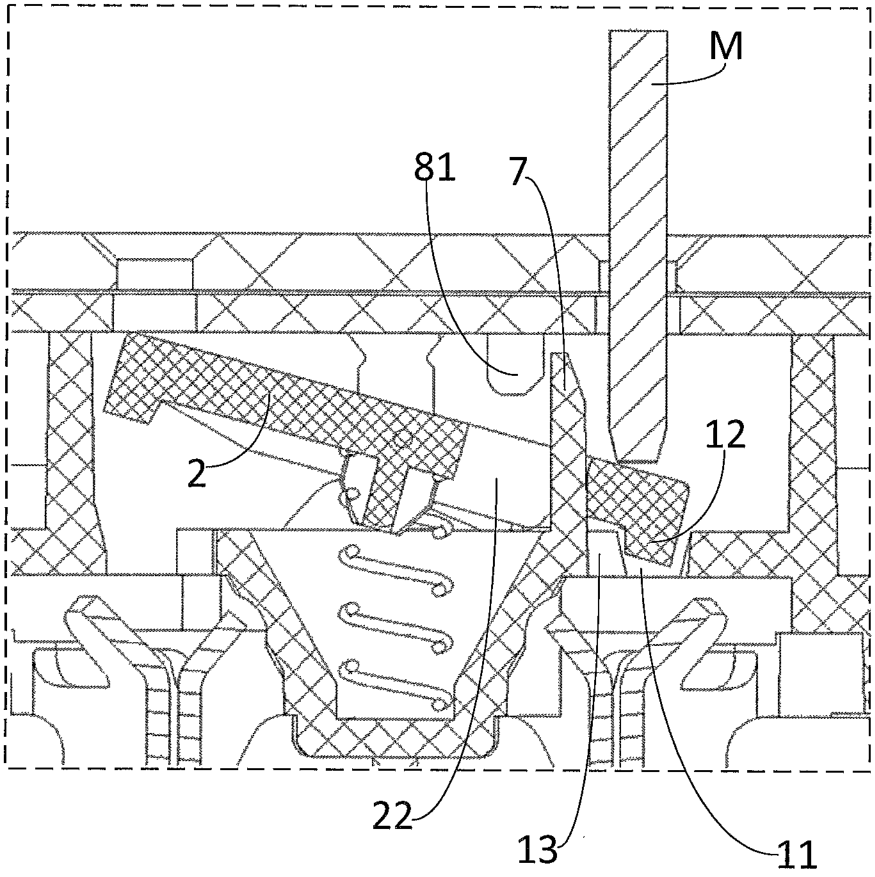
FIG. 15 is a partially enlarged view based on FIG. 14 according to some embodiments of the present disclosure.

As shown in FIG. 14, a thrust is applied to the right side of the protection door 2 in the initial state under the single-pin insertion, the left end of the protection door 2 rotates downward, such that the right side of the protection door 2 is tilted towards a direction more proximal to the bottom support portion 101, namely, the right side of the protection door 2 is more proximal to the first via hole 11 on the right side. In this way, the first stop block 12 on the right side of the protection door 2 enters the first via hole 11 on the right side, such that the first stop block 12 cooperates with the second stop block 13 in the first via hole 11 to achieve a stop. A process of this stop is as shown in FIG. 15, in which the second stop block 13 enters the stop slot 20213 formed by the first stop block 12 on the protection door 2 to form a concave-convex positioning support, such that the protection door 2 is stopped at the same time to block and protect the first via hole 11 disposed on the right side. Thus, the single pin cannot pass through the protection door 2 to enter the plug bush, thereby achieving the purpose of preventing the insertion of the single pin. When the single-pin is pulled out, the protection door 2 is reset in a moving fashion to the initial state by the elastic reset member 3.

The stopper 7 can abut against the wall of the second via hole 22 in the protection door 2 during the insertion of the single pin, thereby preventing the problem of fatigue damage of the elastic reset member 3 highly likely caused by tilt insertion of the pin.

Figure 16:
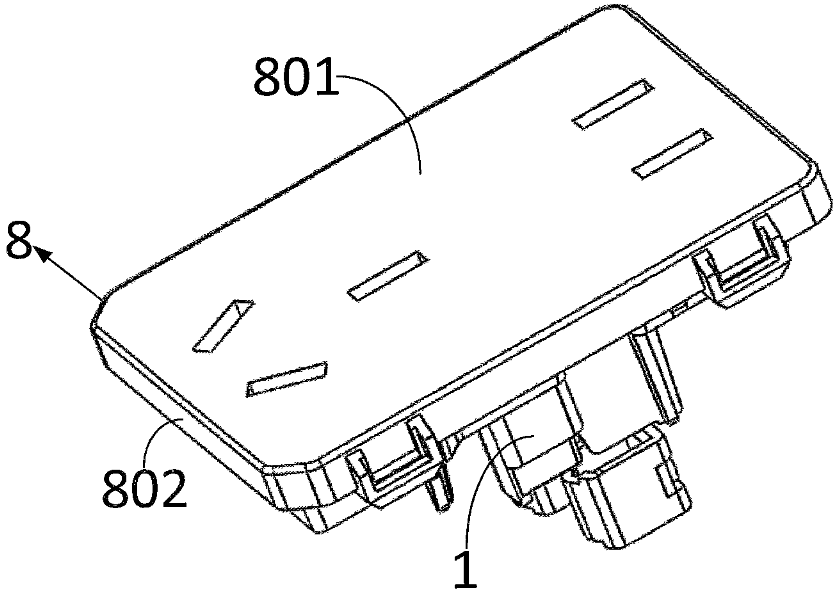
FIG. 16 is a schematic assembled diagram of a socket protection door structure when a face cover is included according to some embodiments of the present disclosure.

As shown in FIG. 16, the socket protection door structure according to the embodiments of the present disclosure further includes a face cover 8 provided with jacks corresponding to jacks of the socket. The face cover 8 is mounted on the support seat 1 in a covering fashion, and the top surface 21 of the protection door 2 is closely attached to the bottom surface of the face cover 8.

In some embodiments, the face cover 8 is connected to the side circumference portion 102 of the support seat 1 in a clamping fashion. In the case that the support seat 1 is provided with a plurality of side circumference portions 102, the face cover 8 is clamped to the side circumference portions 102, such that the face cover 8 encloses both the protection door 2 and the elastic reset member 3 inside the side circumference portions 102.

Figure 17:
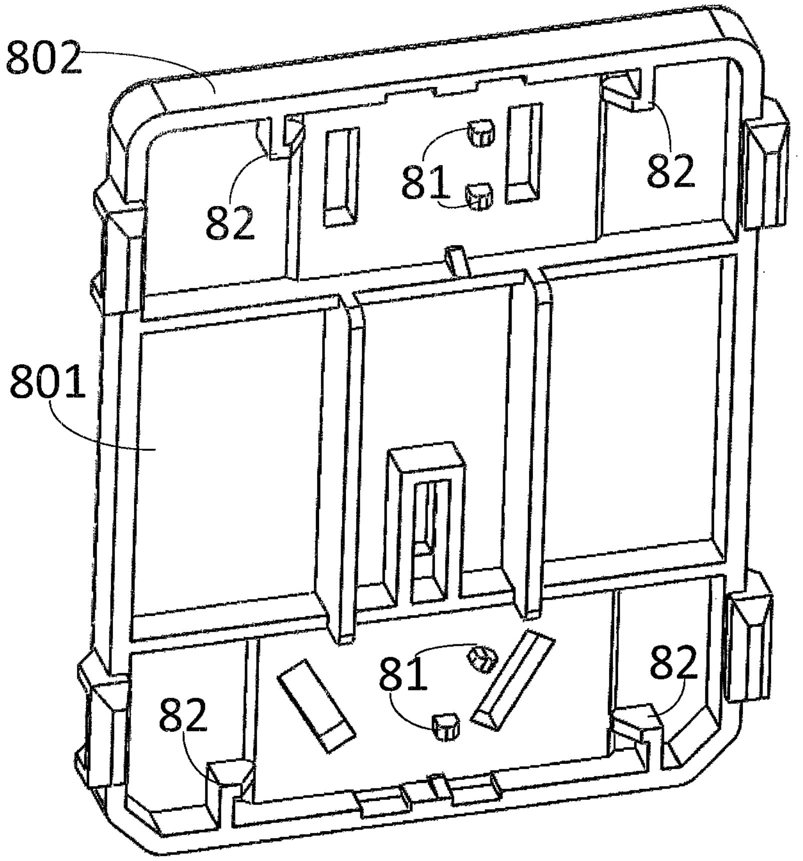
FIG. 17 is a schematic structural diagram of a face cover according to some embodiments of the present disclosure.

As mentioned above, the bottom support portion 101 is provided with the stopper 7, and the stopper 7 is provided with a first face wall abutting against the wall of the second via hole 22 in the protection door 2. In some implementations, as shown in FIG. 17, the socket protection door structure according to the embodiments of the present disclosure further includes a support block 81 disposed on the bottom surface of the face cover 8. In combination with FIG. 15, the support block 81 is configured to abut against a second face wall, opposite the first face wall, of the stopper 7.

In some embodiments, the stopper 7 is in the shape of a flat plate, the first side wall of the stopper 7 is flat, and the second side wall of the stopper 7 is also flat. In other embodiments, the second face wall of the stopper 7 is further provided with a support groove matched with the structure of the support block 81, such that the support block 81 can enter the support groove in a matched fashion, and is configured to abut against the second face wall where the support groove is disposed.

In some embodiments, the support block 81 does not abut against the second face wall of the stopper 7 before the wall of the second via hole 22 of the protection door 2 abuts against the stopper 7. In some embodiments, the support block 81 abuts against the second face wall of the stopper 7 after the wall of the second via hole 22 of the protection door 2 abuts against the stopper 7.

The stopper 7 is supported by providing the support block 81. In particular, when one side of the protection door 2 tilts and abuts against the stopper 7, the stopper 7 is forced and transferred to the support block 81. This arrangement is beneficial to prolonging the anti-fatigue service life of the stopper 7. In addition, the design of the support block 81 can also prevent a problem of reverse mounting of the face cover 8.

In the embodiments of the present disclosure, one or more sets of support blocks 81 are provided. For example, the number of the support blocks 81 is two sets, three sets, or the like. The above effect can be further optimized by supporting the stopper 7 through the plurality sets of support blocks 81 simultaneously. The number of support blocks 81 in each set of support blocks is one or more.

In the embodiments of the present disclosure, the face cover 8 is connected to the side circumference portion 102 of the support seat 1 in a clamping fashion, and this clamping fashion will be described exemplarily below.

As shown in FIG. 17, the socket protection door structure further includes positioning blocks 82 disposed on the bottom surface of the face cover 8. The support seat 1 includes a bottom support portion 101 and a side circumference portion 102. The positioning blocks 82 abut against the outer wall of the side circumference portion 102 to position the face cover 8 on the support seat 1.

A plurality of positioning blocks 82 is provided, and forms a positioning cavity in a fitting fashion. One or more side circumference portions 102 on the support seat 1 are all disposed in the positioning cavity. That is, the walls of the positioning blocks 82 abut against the outer walls of the side circumference portions 102, and the effective fixing between the face cover 8 and the side circumference portions 102 is achieved by the friction force therebetween, thereby ensuring that the jack on the face cover 8 is prevented from deflection.

In some implementations, as shown in FIG. 17, the face cover 8 includes a face wall 801 of the face cover and a side circumference 802 of the face cover. The positioning block 82 and jacks are arranged on the face wall 801 of the face cover. In some embodiments, the positioning block 82 provides positioning for the side circumference portion 102 of the support seat 1 in the second direction D2, such that the partial side circumference 802 of the face cover provides positioning for the side circumference portion 102 of the support seat 1 in the third direction D3. The second direction D2 herein is a distribution direction of the N-pole jack and the L-pole jack, and the third direction D3 is a direction perpendicular to the second direction D2.

Figure 18:
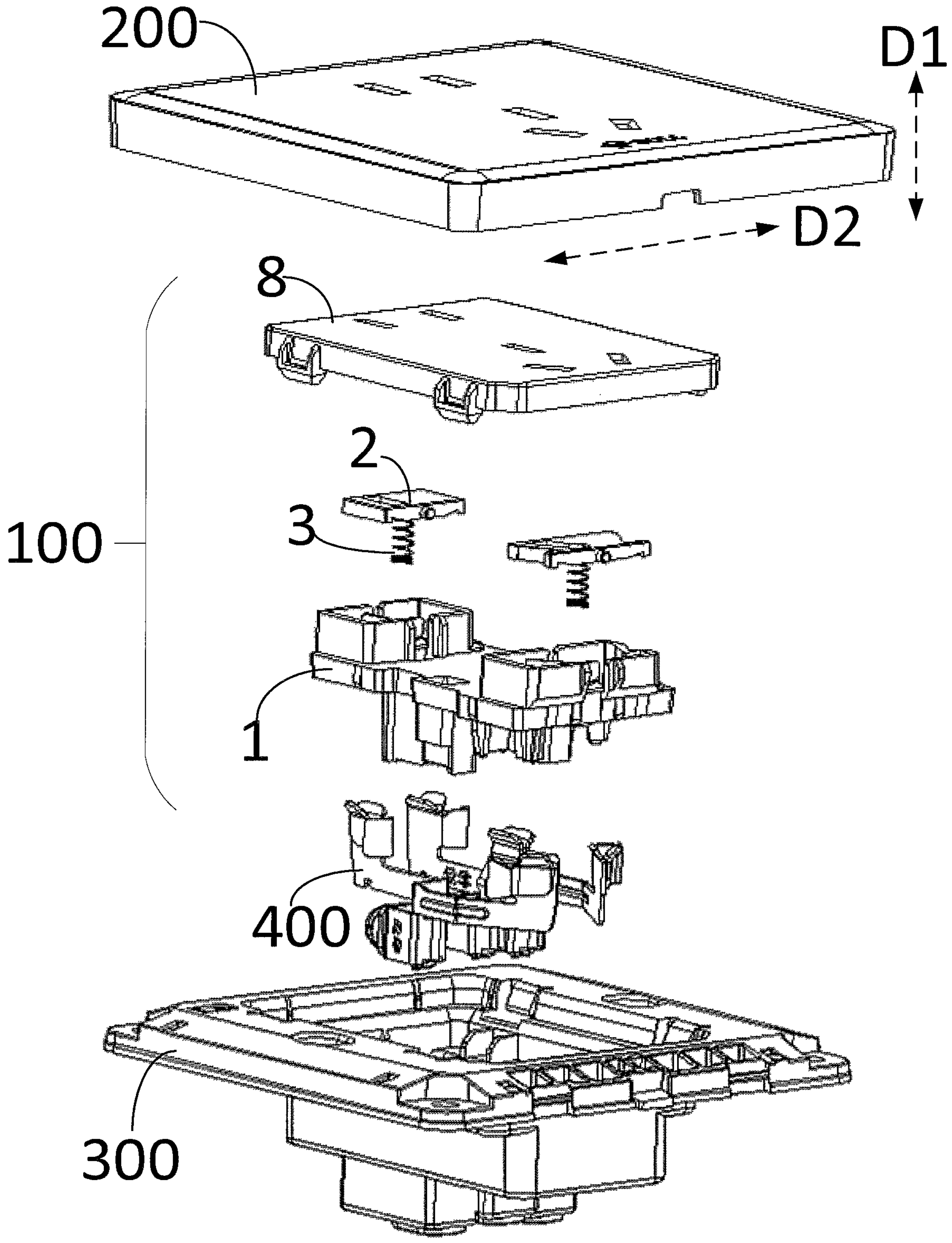
FIG. 18 is a schematic exploded diagram of a socket according to some embodiments of the present disclosure.

In another aspect of the embodiments of the present disclosure, as shown in FIGS. 18 and 19, a socket is further provided, and includes any one of the above socket protection door structures 100.

With the socket protection door structure 100 according to the embodiments of the present disclosure, the socket also has all the advantages of the socket protection door structure 100.

In addition to the above socket protection door structure 100, the socket according to the embodiments of the present disclosure, as shown in FIGS. 18 and 19, further includes a panel 200, a fixing rack 300, and plug bushes 400. The panel 200 is mounted on the face cover 8 in a covering fashion, and the fixing rack 300 is provided with an accommodating cavity for accommodating the support seat 1 of the socket protection door structure 100. The plug bushes 400 are fixed onto the back surface of the support seat 1. The fixing rack 300 is also fixedly connected to the panel 200 to clamp the above socket protection door structure 100 and the plug bushes 400 therebetween, so as to achieve the stable arrangement of these components in the socket. The plug bush 400 at least includes an N-pole plug bush and an L-pole plug bush, and further, includes an E-pole plug bush.

In some embodiments, the socket according to the embodiments of the present disclosure is a two-pole socket, a three-pole socket, or a five-jack socket formed by a two-pole and three-pole combination.

The number of protection doors 2 in the socket protection door structure 100 is determined accordingly based on the number of the plug bushes designed in the socket. In some embodiments, one support seat 1 is designed in one socket. In this case, one bottom support portion 101 of the support seat 1 is designed, and the side circumference portions 102 connected to the bottom support portion 101 correspond to the plug bushes in the socket one by one in the number. Correspondingly, the protection doors 2 and the elastic reset members 3 correspond to the plug bushes in the socket one by one in the number.

It should be noted that all directional indications (such as upper, lower, left and right) in the present disclosure are only used to explain the relative positional relations, motion situation and the like of the components under a specific posture (as shown in the figures). If the specific posture changes, the directional indications will change accordingly.

In the embodiments of the present disclosure, the terms "first" and "second" are only used for a descriptive purpose, and shall not be understood as indicating or implying relative importance. The term "a plurality of/multiple" means two or more, unless otherwise explicitly defined.

The foregoing descriptions are merely for the convenience of those skilled in the art in understanding the technical solutions of the present disclosure, and are not intended to limit the present disclosure. Within the spirit and principles of the present disclosure, any modifications, equivalent substitutions, improvements, etc., are within the protection scope of the present disclosure.

What is claimed is:

1. A socket protection door structure, comprising:

a support seat, a protection door, and an elastic reset member, wherein:

the support seat is provided with two sets of first via holes which correspond to an N-pole plug bush and an L-pole plug bush of a socket, respectively;

the protection door is movably connected to the support seat, and the protection door is provided with a second via hole and is configured to be capable of moving sequentially in a first direction and a second direction, such that one set of the first via holes is exposed and another set of first via holes is correspondingly communicated with the second via hole, wherein the first direction is in a direction perpendicular to a top surface, facing jacks of the socket, of the protection door, and the second direction is in a distribution direction of the two sets of first via holes;

the elastic reset member is disposed between the support seat and the protection door, and is configured to reset the protection door; and the support seat comprises a bottom support portion and a side circumference portion, the socket protection door structure further comprises a stopper, wherein the stopper is disposed on the bottom support portion of the support seat, and a top end of the stopper is disposed in the second via hole of the protection door; and the stopper is capable of abutting against a wall of the second via hole when the protection door is tilted to one side under single-pin insertion.

2. The socket protection door structure according to claim 1, further comprising two sets of outer guide shafts disposed on outer sides of two sets of side walls of the protection door and extending in the second direction, respectively, wherein:

the two sets of first via holes are disposed on the bottom support portion, and a bottom end of the side circumference portion is connected to the bottom support portion; and guide slots are respectively provided on two sets of side walls, extending in the second direction, of the side circumference portion, and are configured to accommodate the outer guide shafts and guide movement of the outer guide shafts in the first direction and the second direction.

3. The socket protection door structure according to claim 2, wherein the guide slot comprises a guide section, a limit section, a first direction section, and a second direction section which are sequentially in communication with one another, each of the guide section, the limit section and the first direction section extends in the first direction, and the second direction section extends in the second direction;

the guide section is configured to guide the outer guide shaft into the limit section;

the limit section is configured to limit the outer guide shaft within the first direction section;

the first direction section is configured to guide the movement of the outer guide shaft in the first direction; and the second direction section is configured to guide the movement of the outer guide shaft in the second direction.

4. The socket protection door structure according to claim 3, wherein the limit section comprises: a third side wall and a fourth side wall which are symmetrically arranged; and a distance between the third side wall and the fourth side wall gradually increases in a direction proximal to the first direction section, and a minimum distance between the third side wall and the fourth side wall is smaller than an outer diameter of the outer guide shaft.

5. The socket protection door structure according to claim 2, wherein the guide slot and the bottom support portion are arranged in a staggered fashion in a third direction, and the third direction is a direction perpendicular to the second direction.

6. The socket protection door structure according to claim 2, further comprising two sets of symmetrically-arranged guide blocks disposed on a top surface of the bottom support portion, wherein the guide block is provided with a guide surface, and the guide surface is obliquely arranged and extends in the second direction;

the guide surface is configured to be in contact with the protection door to guide movement of the protection door; and the movement of the protection door comprises movement of the protection door in the second direction driven by two-pin, and tilting movement of the protection door driven by single-pin.

7. The socket protection door structure according to claim 6, further comprising two sets of inner guide shafts, wherein:

the two sets of inner guide shafts are symmetrically disposed on the protection door, and the two sets of inner guide shafts correspond to the two sets of guide blocks one by one; and the inner guide shaft is configured to be in contact with the corresponding guide surface to guide the movement of the protection door.

8. The socket protection door structure according to claim 7, wherein the protection door comprises: a protection door panel and a frame body, the protection door panel is provided with the top surface, and is connected to a top end of the frame body, and the frame body is movably connected to the support seat; and the inner guide shafts are disposed on inner sides of two sets of side walls of the frame body which extend in the second direction.

9. The socket protection door structure according to claim 6, wherein the frame body comprises: a side frame and a panel rack, the panel rack is disposed inside the side frame, and the side frame is movably connected to the support seat;

two sets of escape slots are arranged on a bottom surface of the panel rack, and correspond to the two sets of guide blocks one by one; and the escape slot at least receives a top of the corresponding guide block when the protection door moves in the second direction.

10. The socket protection door structure according to claim 6, wherein the guide block is in contact with a panel bottom or a side wall bottom of the protection door.

11. The socket protection door structure according to claim 1, further comprising two sets of first stop blocks and two sets of second stop blocks, wherein:

the two sets of first stop blocks correspond to the two sets of second stop blocks one by one, and are respectively disposed on two sides, extending in a third direction, of the protection door, and the two sets of second stop blocks are disposed on side walls of the two sets of first via holes, respectively, wherein the third direction is a direction perpendicular to the second direction; and when the protection door is tilted under single-pin insertion, the first stop block tilted in a direction proximal to the first via hole cooperates with the corresponding second stop block to achieve a stop.

12. The socket protection door structure according to claim 11, wherein the protection door comprises: a protection door panel and a frame body;

the protection door panel is provided with the top surface and the second via hole, and is connected to a top end of the frame body, and the frame body is movably connected to the support seat; and the two sets of first stop blocks are disposed at bottom ends of two sets of side walls of the frame body which extend in the third direction, respectively.

13. The socket protection door structure according to claim 12, wherein the frame body comprises: two sets of first side plates arranged oppositely and two sets of second side plates arranged oppositely;

two ends of the first side plate are vertically connected to two ends of the second side plate, respectively, and the second side plate extends in the third direction; and the first stop block is disposed at a bottom end of the second side plate, and a stop slot is provided between the first stop block and the first side plate, and is configured to accommodate the second stop block.

14. The socket protection door structure according to claim 13, wherein a bottom wall of the first side plate comprises a main body section and two sets of tilt sections disposed on two sides of the main body section; and a first end of the tilt section is connected to the main body section, and a second end of the tilt section is connected to the first stop block and is more proximal to the protection door panel relative to the first end.

15. The socket protection door structure according to claim 1, further comprising a fixing block, wherein the fixing block is disposed on a bottom surface of the protection door, and is connected to the elastic reset member; and the elastic reset member is a compression spring, and a top end of the elastic reset member sleeves the fixing block.

16. The socket protection door structure according to claim 15, wherein the support seat is provided with a limit groove, and the limit groove is configured to accommodate a bottom of the elastic reset member and allow the elastic reset member to correspondingly move along with the moving protection door.

17. The socket protection door structure according to claim 16, wherein the limit groove comprises a first groove wall and a second groove wall which are symmetrically arranged and are distributed in the second direction; and at least one of the first groove wall and the second groove wall is obliquely arranged and extends in the second direction to receive the elastic reset member moving with the protection door.

18. The socket protection door structure according to claim 1, further comprising: a face cover provided with jacks corresponding to the jacks of the socket; and the face cover is mounted on the support seat in a covering fashion, and a bottom surface of the face cover is closely attached to the top surface of the protection door;

the socket protection door structure further comprises a support block disposed on the bottom surface of the face cover;

the stopper is provided with a first face wall configured to abut against the wall of the second via hole in the protection door; and the support block is configured to abut against a second face wall of the stopper, and the second face wall is opposite to the first face wall.

19. The socket protection door structure according to claim 18, further comprising a positioning block disposed on the bottom surface of the face cover; and the support seat comprises a side circumference portion, and the positioning block abuts against an outer wall of the side circumference portion to position the face cover on the support seat.

20. A socket, comprising:

a socket protection door structure, wherein the socket protection door structure comprises: a support seat, a protection door, and an elastic reset member, wherein:

the support seat is provided with two sets of first via holes which correspond to an N-pole plug bush and an L-pole plug bush of a socket, respectively;

the protection door is movably connected to the support seat, and the protection door is provided with a second via hole and is configured to be capable of moving sequentially in a first direction and a second direction, such that one set of the first via holes is exposed and another set of first via holes is correspondingly communicated with the second via hole, wherein the first direction is in a direction perpendicular to a top surface, facing jacks of the socket, of the protection door, and the second direction is in a distribution direction of the two sets of first via holes;

the elastic reset member is disposed between the support seat and the protection door, and is configured to reset the protection door; and the support seat comprises a bottom support portion and a side circumference portion, the socket protection door structure further comprises a stopper, wherein the stopper is disposed on the bottom support portion of the support seat, and a top end of the stopper is disposed in the second via hole of the protection door; and the stopper is capable of abutting against a wall of the second via hole when the protection door is tilted to one side under single-pin insertion.

* * * * *